(12) United States Patent
Olsson et al.

(10) Patent No.: US 12,238,579 B2
(45) Date of Patent: Feb. 25, 2025

(54) DNN MANIPULATION USING SELECTION PRIORITY

(71) Applicant: Telefonaktiebolaget LM Ericsson (publ), Stockholm (SE)

(72) Inventors: Lasse Olsson, Träslövsläge (SE); Peter Ramle, Mölnlycke (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 230 days.

(21) Appl. No.: 17/763,248

(22) PCT Filed: Dec. 6, 2019

(86) PCT No.: PCT/EP2019/084035
§ 371 (c)(1),
(2) Date: Mar. 24, 2022

(87) PCT Pub. No.: WO2021/069087
PCT Pub. Date: Apr. 15, 2021

(65) Prior Publication Data
US 2022/0345941 A1 Oct. 27, 2022

Related U.S. Application Data

(60) Provisional application No. 62/911,494, filed on Oct. 7, 2019.

(51) Int. Cl.
*H04W 48/18* (2009.01)
*H04W 28/08* (2023.01)
*H04W 76/12* (2018.01)

(52) U.S. Cl.
CPC ....... *H04W 28/0925* (2020.05); *H04W 48/18* (2013.01); *H04W 76/12* (2018.02)

(58) Field of Classification Search
CPC .. H04W 48/18; H04W 76/12; H04W 28/0925
See application file for complete search history.

(56) References Cited

U.S. PATENT DOCUMENTS 10,491,376 B1 * 11/2019 Suthar .................... H04L 63/102
2018/0270781 A1 * 9/2018 Baek ...................... H04W 60/06
(Continued)

FOREIGN PATENT DOCUMENTS

WO 2020200501 A1 12/2019

OTHER PUBLICATIONS

Ericsson, DNN replacement in 5GC, Jun. 14-28, 2019, 3GPP Tsg-Sa WG2 Meeting #134, Sapporo, S2-1908141, 5 pages.*
(Continued)

*Primary Examiner* — Dai Phuong
(74) *Attorney, Agent, or Firm* — COATS & BENNETT, PLLC

(57) ABSTRACT

A method implemented by a Policy Control Function (PCF) of a Core Network (CN) node in a communications network includes receiving a request message from an Access and Mobility management Function (AMF). The request message includes a requested Data Network Name (DNN) designated by a wireless terminal in a Protocol Data Unit (PDU) session establishment request to the AMF. Responsive to the request message and to session-specific information, a selected DNN and a Session Management Function (SMF) index is determined. Each of one or more SMFs are registered with a Network Repository Function (NRF) of the CN node or a different CN node according to a corresponding SMF profile. The selected DNN and the SMF index are sent to the AMF to facilitate selection of one of the one or more SMFs via the NRF for establishment of the PDU session between the wireless terminal and the selected SMF.

19 Claims, 23 Drawing Sheets

(56) References Cited

U.S. PATENT DOCUMENTS

2020/0015294 A1* 1/2020 Xin ................... H04W 80/10
2021/0360722 A1* 11/2021 Kawasaki ............ H04W 76/18
2022/0201543 A1* 6/2022 Zhu ................. H04W 28/0925

OTHER PUBLICATIONS

Ericsson, "Selection of I-SMF and learning of SMF Service Area", Sa WG2 Meeting #128-BIS, Sophia Antipolis, France, Aug. 20-25, 2018, pp. 1-4, S2-188762, 3GPP.

3rd Generation Partnership Project, "3rd Generation Partnership Project; Technical Specification Group Services and System Aspects; Procedures for the 5G System (5GS); Stage 2 (Release 16)", Technical Specification, 3GPP TS 23.502 V16.2.0, Sep. 1, 2019, pp. 1-525, 3GPP.

3rd Generation Partnership Project, "3rd Generation Partnership Project; Technical Specification Group Services and System Aspects; System Architecture for the 5G System (5GS); Stage 2 (Release 16)", Technical Specification, 3GPP TS 23.501 V16.2.0, Sep. 1, 2019, pp. 1-391, 3GPP.

3rd Generation Partnership Project, "3rd Generation Partnership Project; Technical Specification Group Services and System Aspects; Policy and Charging Control Framework for the 5G System (5GS); Stage 2 (Release 16)", Technical Specification, 3GPP TS 23.503 V16.2.0, Sep. 1, 2019, pp. 1-104, 3GPP.

3rd Generation Partnership Project, "3rd Generation Partnership Project; Technical Specification Group Services and System Aspects; Procedures for the 5G System (5GS); Stage 2 (Release 15)", Technical Specification, 3GPP TS 23.502 V15.7.0, Sep. 1, 2019, pp. 1-357, 3GPP.

Ericsson et al., "DNN replacement", 3GPP TSG-SA WG2 Meeting #134, Sapporo, Japan, Jun. 24, 2019, pp. 1-9, S2-1908143, 3GPP.

Ericsson et al., "DNN replacement", 3GPP TSG-SA WG2 Meeting #134, Sapporo, Japan, Jun. 24, 2019, pp. 1-26, S2-1908142, 3GPP.

Ericsson et al., "DNN replacement in 5GC", 3GPP TSG-SA WG2 Meeting #134, Sapporo, Japan, Jun. 24, 2019, pp. 1-5, S2-1908141, 3GPP.

Ericsson, "DNN replacement in 5GC", 3GPP TSG-SA WG2 Meeting #135, Split, Croatia, Oct. 14, 2019, pp. 1-8, S2-1909793, 3GPP.

Ericsson, "DNN replacement in 5GC", 3GPP TSG-SA WG2 Meeting #135, Split, Croatia, Oct. 14, 2019, pp. 1-3, S2-1909795, 3GPP.

Ericsson, "APN Resolve and Redirect for LTE Access", Technical Product Decription, May 15, 2017, pp. 1-23, Ericsson.

* cited by examiner

Core Access and Mobility Management Function (AMF) Node Operations

Core Access and Mobility Management Function (AMF) Node Operations

Core Access and Mobility Management Function (AMF) Node Operations

DNN MANIPULATION USING SELECTION PRIORITY

CROSS-REFERENCE TO RELATED APPLICATIONS

This application claims the benefit of U.S. Provisional Application No. 62/911,494, filed Oct. 7, 2019.

TECHNICAL FIELD

The present disclosure generally relates to the field of communications, and more particularly, to wireless communications methods, devices, and networks.

BACKGROUND

When a wireless terminal submits a request to the network to establish a Protocol Data Unit (PDU) session, the wireless terminal may include a requested Data Network Name (DNN) with the request. The Access and Mobility management Function (AMF) in the Core Network (CN), in response to this PDU session establishment request, selects a Session Management Function (SMF), and establishes a signalling connection between the wireless terminal and the selected SMF. The SMF then retrieves the DNN-related data from User Data Management (UDM) in the CN using the requested DNN and/or a selected DNN (triggered by the AMF and selected by a Policy Control Function (PCF) responsive to the requested DNN). In order to accommodate the various possible DNNs, e.g., the requested DNN and various selected DNN(s), the wireless terminal's subscription data or local configuration within the SMF may contain a large number of DNNs, which not only increases operating costs, but also requires an update of the subscription data or the SMF local configuration each time a new way of DNN-based SMF selection is needed, which increases cost, does not scale, is inflexible, and increases the risk of misconfiguration in the CN. Thus, improvements to SMF selection are needed to provide a more dynamic SMF selection process.

SUMMARY

The solution presented herein enables dynamic selection of an SMF, by the AMF, for a PDU session between a wireless terminal and the selection SMF. In so doing, the solution presented herein enables the operator to configure the SMF selection in a flexible way without the need for updating either the subscription data or any local configuration in the SMF. This flexibility in the SMF selection mechanism enables SMF selection based, e.g., on UE type, subscription ID, UE location, subscription categories, etc.

One exemplary embodiment comprises a method implemented by a PCF of a CN node in a communications network. The method comprises receiving a request message from an AMF of the CN node, the request message comprising a requested DNN designated by a wireless terminal in a PDU session establishment request to the AMF. Responsive to the request message and to session-specific information, PCF determines a selected DNN and an SMF index, where the SMF index corresponds to one or more SMFs of the CN node, and where each of the SMF(s) is registered with a Network Repository Function (NRF) of the CN node according to a corresponding SMF profile. The method further comprises the PCF sending the selected DNN and the SMF index to the AMF to facilitate selection of one of the one or more SMFs via the NRF for establishment of the PDU session between the wireless terminal and the selected SMF.

According to exemplary embodiments of this method, selecting the DNN comprises manipulating the requested DNN to generate the selected DNN or replacing the requested DNN with a selected DNN. According to exemplary embodiments of this method, the SMF index comprises an SMF Selection index. According to exemplary embodiments of this method, the session-specific information comprises one or more device-specific characteristics of the wireless terminal requesting the PDU session and/or one or more subscriber-specific characteristics of a subscriber requesting the PDU session and/or one or more capabilities of the one or more SMFs corresponding to the SMF index and/or one or more heuristic analysis capabilities. The one or more device-specific characteristics of the wireless terminal may comprise one or more capabilities of the wireless terminal and/or a terminal identifier and/or a location of the wireless terminal in the communications network. The one or more subscriber-specific characteristics may comprise a subscriber subscription and/or a subscriber identifier. According to exemplary embodiments of this method, the session-specific information is stored in at least the PCF. According to exemplary embodiments of this method, each SMF profile defines one or more supported sets of SMF indexes. The one or more supported sets of SMF indexes are configured on a DNN level, and/or on a Single Network Slice Selection Assistance Information (S-NSSAI) level, and/or on an SMF level.

One exemplary embodiment comprises a PCF of a CN node in a communications network, where the PCF comprises one or more processing circuits configured to perform any of the above-described PCF method steps.

One exemplary embodiment comprises a computer program product for controlling a PCF of a CN node in a communications network. The computer program product comprises software instructions which, when run on at least one processing circuit in the PCF, causes the PCF to execute any of the above-described PCF method steps. In exemplary embodiments, a computer-readable medium comprises this computer program product. The computer-readable medium comprises a non-transitory computer-readable medium.

One exemplary embodiment comprises a method implemented by an AMF of a CN node in a communications network. The method comprises receiving a PDU session establishment request from a wireless terminal in the communications network, the PDU session establishment request including a requested DNN. The method further comprises sending a request message to a PCF of the CN node, where the message comprises the requested DNN. In response to the request message, the AMF receives a response message from the PCF, where the response message includes a selected DNN and an SMF index, each of which were selected by the PCF responsive to the requested DNN and session-specific information. The SMF index corresponds to one or more SMFs of the CN node, where each of the SMF(s) is registered with an NRF of the CN node according to a corresponding SMF profile. The method further comprises establishing a PDU session between the wireless terminal and one of the one or more SMFs associated with the SMF index responsive to the reception of the response message. According to exemplary embodiments of this method, establishing the PDU session comprises sending the selected DNN and the SMF index from the AMF to the NRF of the CN node, receiving, from the NRF, a list of SMFs including the one or more SMFs corresponding to the SMF index, selecting one of the one or more SMFs in the list of SMFs for the PDU session, and establishing the PDU session between the wireless terminal and the selected SMF. According to exemplary embodiments of this method, the SMF index comprises an SMF Selection index. According to exemplary embodiments of this method, the session-specific information comprises one or more device-specific characteristics of the wireless terminal requesting the PDU session and/or one or more subscriber-specific characteristics of a subscriber requesting the PDU session and/or one or more capabilities of the one or more SMFs corresponding to the SMF index and/or one or more heuristic analysis capabilities. The one or more device-specific characteristics of the wireless terminal may comprise one or more capabilities of the wireless terminal and/or a terminal identifier and/or a location of the wireless terminal in the communications network. The one or more subscriber-specific characteristics may comprise a subscriber subscription and/or a subscriber identifier. According to exemplary embodiments of this method, each SMF profile defines one or more supported sets of SMF indexes. The one or more supported sets of SMF indexes are configured on a DNN level, and/or on a Single Network Slice Selection Assistance Information (S-NSSAI) level, and/or on an SMF level.

One exemplary embodiment comprises an AMF of a CN node in a communications network. The AMF comprises one or more processing circuits configured to perform any of the above-described AMF method steps.

One exemplary embodiment comprises a computer program product for controlling an AMF of a CN node in a communications network. The computer program product comprises software instructions which, when run on at least one processing circuit in the AMF, causes the AMF to execute any of the above-described AMF method steps. In exemplary embodiments, a computer-readable medium comprises this computer program product. The computer-readable medium comprises a non-transitory computer-readable medium.

One exemplary embodiment comprises a method implemented by a CN node of a communications network comprising a wireless terminal in communication with the CN node. The method comprises receiving a PDU session establishment request from the wireless terminal, where the PDU session establishment request includes a requested DNN. Responsive to the requested DNN and to session-specific information, the CN determines a selected DNN and an SMF index. The SMF index corresponds to one or more SMFs of the CN node, where each of the SMF(s) is registered with an NRF of the CN node according to a corresponding SMF profile. The method further comprises establishing a PDU session between the wireless terminal and one of the one or more SMFs corresponding to the SMF index and responsive to the selected DNN and the SMF index. According to exemplary embodiments of this method, determining the selected DNN and the SMF index comprises receiving, at a PCF of the CN node, a request message from an AMF of the CN node, where the request message comprises the requested DNN; determining, by the PCF and responsive to the received message and to session-specific information, the selected DNN and the SMF index; and sending a response message including the selected DNN and the SMF index from the PCF to the AMF. According to exemplary embodiments of this method, establishing the PDU session comprises the AMF establishing the PDU session between the wireless terminal and one of the one or more SMFs associated with the SMF index responsive to the AMF receiving the response message. According to exemplary embodiments of this method, establishing the PDU session further comprises sending the selected DNN and the SMF index from the AMF to the NRF of the CN node; receiving, from the NRF, a list of SMFs including the one or more SMFs corresponding to the SMF index; selecting, by the AMF, one of the one or more SMFs in the list of SMFs; and establishing the PDU session between the wireless terminal and the selected SMF. According to exemplary embodiments of this method, the method further comprises providing the SMF index from the AMF to the SMF and selecting, by the SMF, a dedicated UPF for pre-paid subscribers responsive to the SMF index. According to exemplary embodiments of this method, selecting the DNN comprises manipulating the requested DNN to generate the selected DNN or replacing the requested DNN with a selected DNN. According to exemplary embodiments of this method, the SMF index comprises an SMF Selection index. According to exemplary embodiments of this method, the session-specific information comprises one or more device-specific characteristics of the wireless terminal requesting the PDU session, and/or one or more subscriber-specific characteristics of a subscriber requesting the PDU session, and/or one or more capabilities of the one or more SMFs corresponding to the SMF index, and/or one or more heuristic analysis capabilities. The one or more device-specific characteristics of the wireless terminal may comprise one or more capabilities of the wireless terminal and/or a terminal identifier and/or a location of the wireless terminal in the communications network. The one or more subscriber-specific characteristics may comprise a subscriber subscription and/or a subscriber identifier. According to exemplary embodiments of this method, each SMF profile defines one or more supported sets of SMF indexes. According to exemplary embodiments of this method, the one or more supported sets of SMF indexes are configured on a DNN level, and/or on a Single Network Slice Selection Assistance Information (S-NSSAI) level, and/or on an SMF level.

One exemplary embodiment comprises a CN node in a communications network. The CN node comprises one or more processing circuits configured to perform any of the above-described CN method steps.

One exemplary embodiment comprises a computer program product for controlling a CN node in a communications network. The computer program product comprises software instructions which, when run on at least one processing circuit in the CN, causes the CN to execute any of the above-described CN method steps. In exemplary embodiments, a computer-readable medium comprises this computer program product. The computer-readable medium comprises a non-transitory computer-readable medium.

One exemplary embodiment comprises a method implemented by an NRF of a CN node in a communications network. The method comprises receiving a registration request from each of one or more SMFs in the CN node. The registration request includes a corresponding SMF profile defining one or more sets of SMF indexes supported by the corresponding SMF. The method further comprises registering each SMF with the NRF according to the corresponding SMF profile. According to exemplary embodiments of this method, the one or more supported sets of SMF indexes are configured on a DNN level, and/or on a Single Network Slice Selection Assistance Information (S-NSSAI) level, and/or on an SMF level. According to exemplary embodiments of this method, the method further comprises receiving a selected DNN and an SMF index, each determined by a PCF of the CN node, from an AMF of the CN node. Responsive to the selected DNN and the SMF index, the NRF sends, to the AMF, a list of SMFs including the one or more SMFs to facilitate establishment by the AMF of a PDU session between a wireless terminal and a selected one of the one or more SMFs in the list of SMFs.

One exemplary embodiment comprises an NRF of a CN node in a communications network. The NRF comprises one or more processing circuits configured to perform any of the above-described NRF method steps.

One exemplary embodiment comprises a computer program product for controlling an NRF of a CN node in a communications network. The computer program product comprises software instructions which, when run on at least one processing circuit in the NRF, causes the NRF to execute any of the above-described NRF method steps. In exemplary embodiments, a computer-readable medium comprises this computer program product. The computer-readable medium comprises a non-transitory computer-readable medium.

DETAILED DESCRIPTION

Before presenting details of the solution presented herein, the following first generally describes a communications network relative to Network Functions (NFs) of a Core Network (CN) node.

Figure 1:
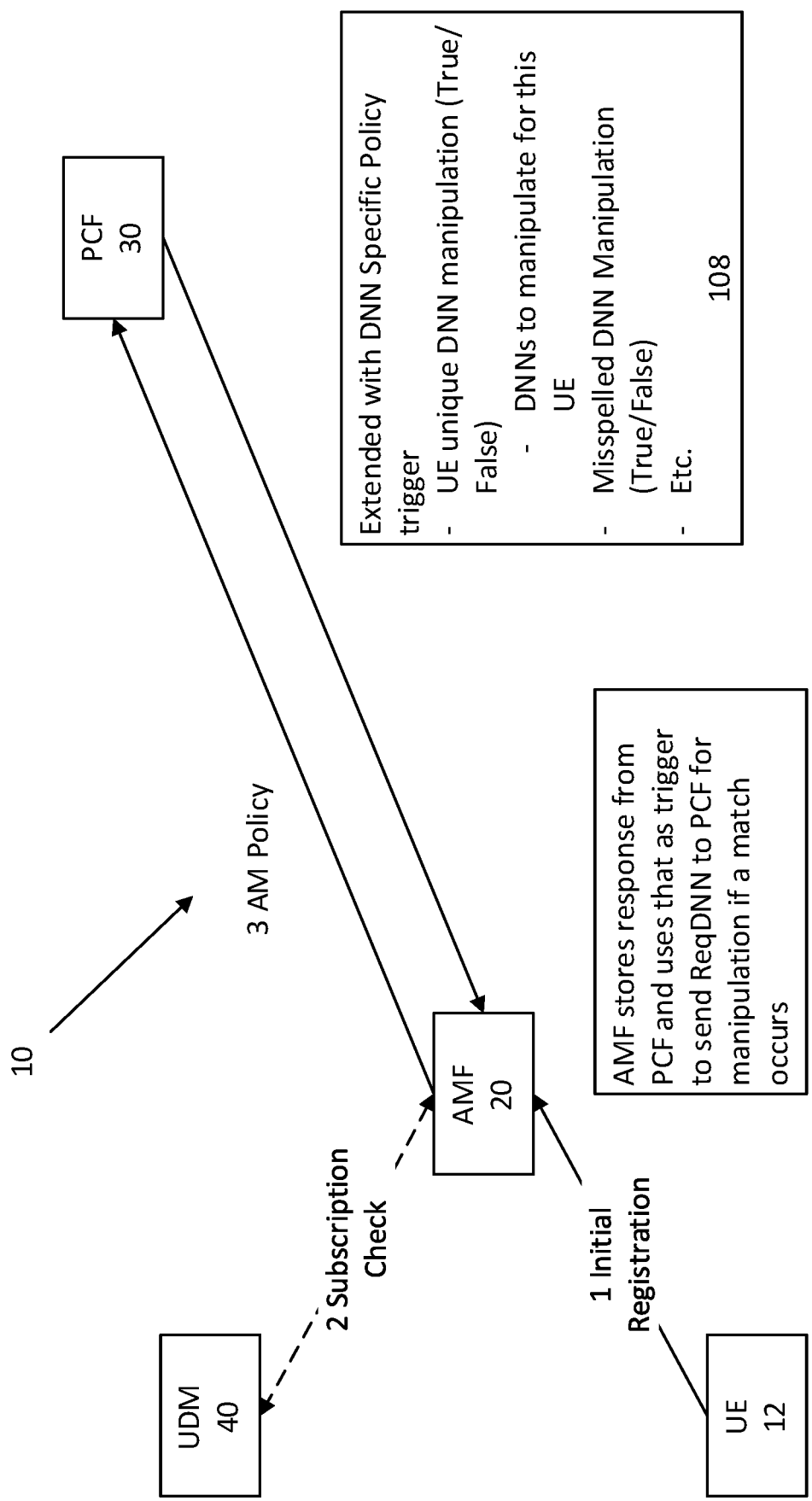
FIG. 1 shows a diagram of a communications network for a UE-centric trigger definition.

FIG. 1 shows a diagram of a wireless communications network 10 including a wireless terminal 12 and a Core Network (CN) node, which comprises a plurality of Network Functions (NFs), e.g., Access and Mobility management Function (AMF) 20, Policy Control Function (PCF) 30, and a Unified Data Management (UDM) 40. The CN node also includes a Network Repository Function (NRF) 50 (FIG. 2) and a Session Management Function (SMF) (not shown in FIGS. 1 and 2), which may alternatively be referred to as an SMF instance. These NFs nodes are part of the $3^{rd}$ Generation Partnership Project (3GPP) 5G architecture, described in 3GPP 23.501. In accordance with an example, the NFs are embodied on the same CN node. In accordance with another example, the NFs are embodied on one or more different CN nodes. Functions of the AMF 20 include but are not necessarily limited to registration management, connection management, reachability management, mobility management and various functions related to security and access management and authorization. Functions of the PCF 30 include but are not necessarily limited to supporting a unified policy framework that governs network behavior. In so doing, the PCF 30 provides policy rules for control and user plane functions that enforce them, which include network slicing, roaming, mobility management, quality of service (QoS) policy, charging control functions, etc. Functions of the UDM 40 include but are not necessarily limited to Subscription management. Functions of the NRF 50 include but are not necessarily limited to supporting the service discovery function, e.g., selection of an SMF. Functions of the SMF include but are not necessarily limited to functions relating to subscriber sessions, e.g., session establishment, modify and release.

UE centric triggers are also referred to herein as a set of UE unique manipulation triggers. The set of UE unique manipulation triggers are based on one or more characteristics of a particular UE. Examples of the one or more UE characteristics include but are not necessarily limited to the Generic Public Subscription Identifier (GPSI) (e.g., MSISDN) of the particular UE, the geographic location of the particular UE, and a requested Data Network Name (DNN) included in a PDU session establishment request from a particular UE. A trigger is activated in response to one of the UE characteristics matching a preset value.

In general, the AMF 20 receives an initial registration from the UE 12, which includes a requested DNN. The AMF 20 checks the authorization of the UE 12 by comparing the requested DNN to subscription information stored by the UDM 40. An association between the PCF 30 and the AMF 20 is established on a per UE basis. The AMF 20 receives a set of UE unique DNN manipulation triggers from the PCF 30. The AMF 20 stores the set of UE unique DNN manipulation triggers and determines whether any of the triggers are activated in response to a PDU session establishment request including a requested DNN.

Figure 2:
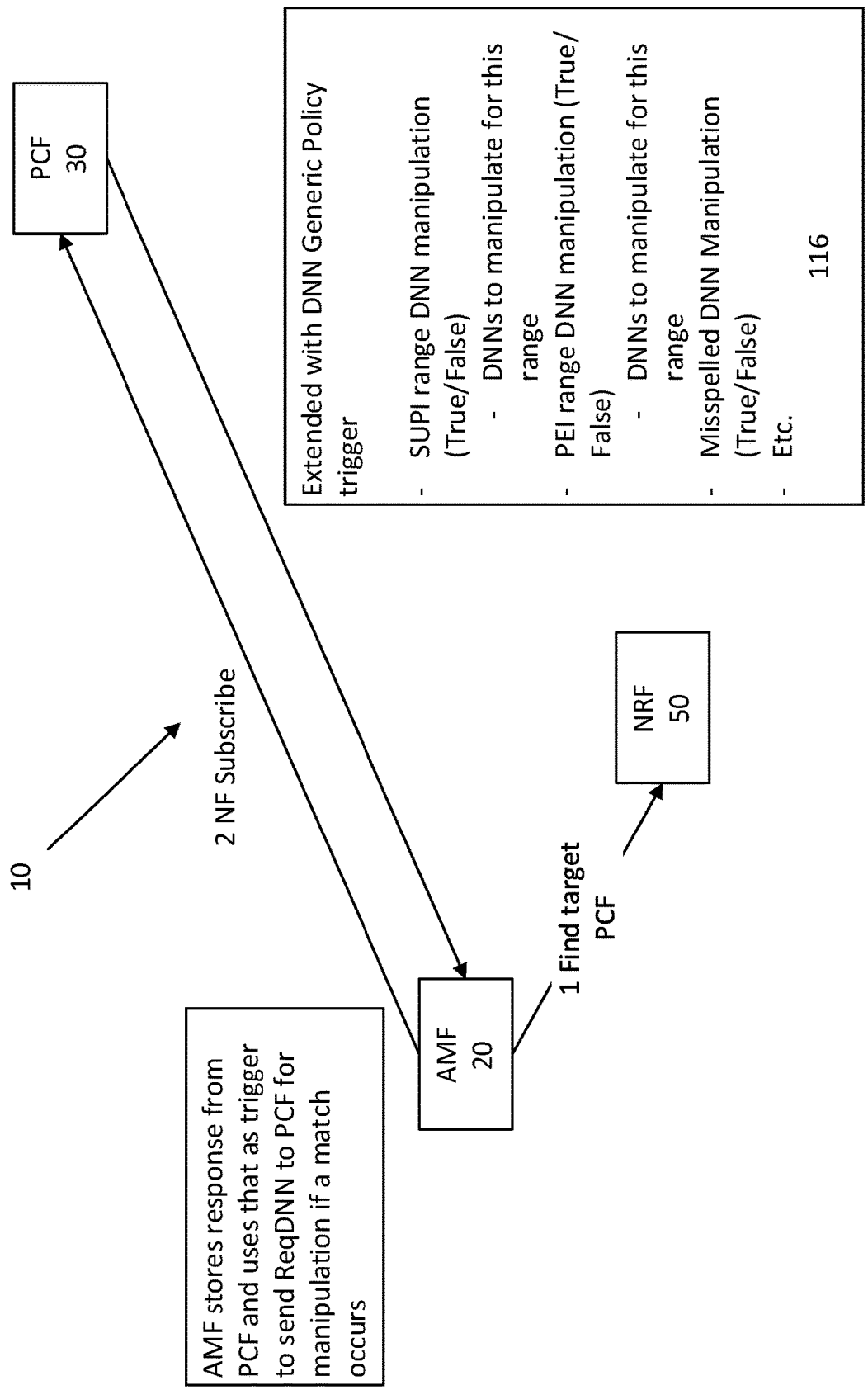
FIG. 2 shows a diagram of a communications network for an NF-centric trigger definition.

FIG. 2 shows a diagram of the communications network 10 including NFs 20-50 and logic 116 for a device or subscriber centric trigger. The device or subscriber centric triggers are also referred to herein as a set generic DNN manipulation triggers. Examples of a set of generic DNN manipulation triggers include but are not necessarily limited to parts of a Permanent Equipment Identifier (PEI) identifying a specific range of UE and/or a Subscriber Permanent Identifier (SUPI) range identifying a specific range of subscribers. A trigger is activated in response to at least one of the PEI parts (e.g., Type Allocation Code (TAC)), being within the specific range of the UE or the SUPI being within the SUPI range.

FIGS. 3-7 show a flow chart illustrating exemplary operations of an AMF 20, as shown in FIGS. 1-2. In block 702, one or more triggers are received from a PCF 30 by an AMF 20. Operations for receiving the set of generic DNN manipulation triggers and the set of UE unique DNN manipulation triggers will be described with reference to FIG. 7. The triggers are stored by the AMF 20.

In block 704, a PDU session establishment request is received from the UE 12. The PDU session establishment request includes a requested DNN.

In block 706, the subscription of the UE 12 is checked using subscription information in the UDM 40 (FIG. 1) similar to that previously described. The requested DNN is compared to subscription information stored by the UDM 40.

In block 708, a determination is made if there is a match between the requested DNN and the subscription information. If there is a match, the method 700 advances to block 726. If there is not a match between the requested DNN and the subscription information, the method 700 advances to block 710 in FIG. 5.

In block 710, a determination is made if a trigger has been activated. In some embodiments, the trigger is one of a set of generic DNN manipulation triggers or a set of UE unique manipulation triggers. In accordance with the embodiment in FIG. 5, if a trigger has not been activated, the AMF 20 rejects the PDU session establishment request in block 712. In other embodiments, other actions may be performed. If a trigger is activated in block 710, the method 700 advances to block 714.

In block 714, a message is transmitted to the PCF 30 to replace the requested DNN with a replacement DNN in response to the requested DNN not matching the subscription information and the trigger being activated. The message includes the requested DNN and optionally other relevant information. Examples of the other relevant information include the UE geographic location, UE network capability, etc. In block 716, the replacement DNN is received from the PCF 30 by the AMF 20. In block 718, the replacement DNN is transmitted to the UE 12 for the UE to use the replacement DNN in future PDU session establishment requests. In block 720, the replacement DNN 720 is transmitted to the NRF 50 for selection of an SMF. In block 722, a notification of a selected SMF is received by the AMF 20. In block 724, a PDU session establishment request message is forwarded by the AMF 20 to the selected SMF. In block 725, the PDU session is established between the UE 12 and the selected SMF.

Figure 3:
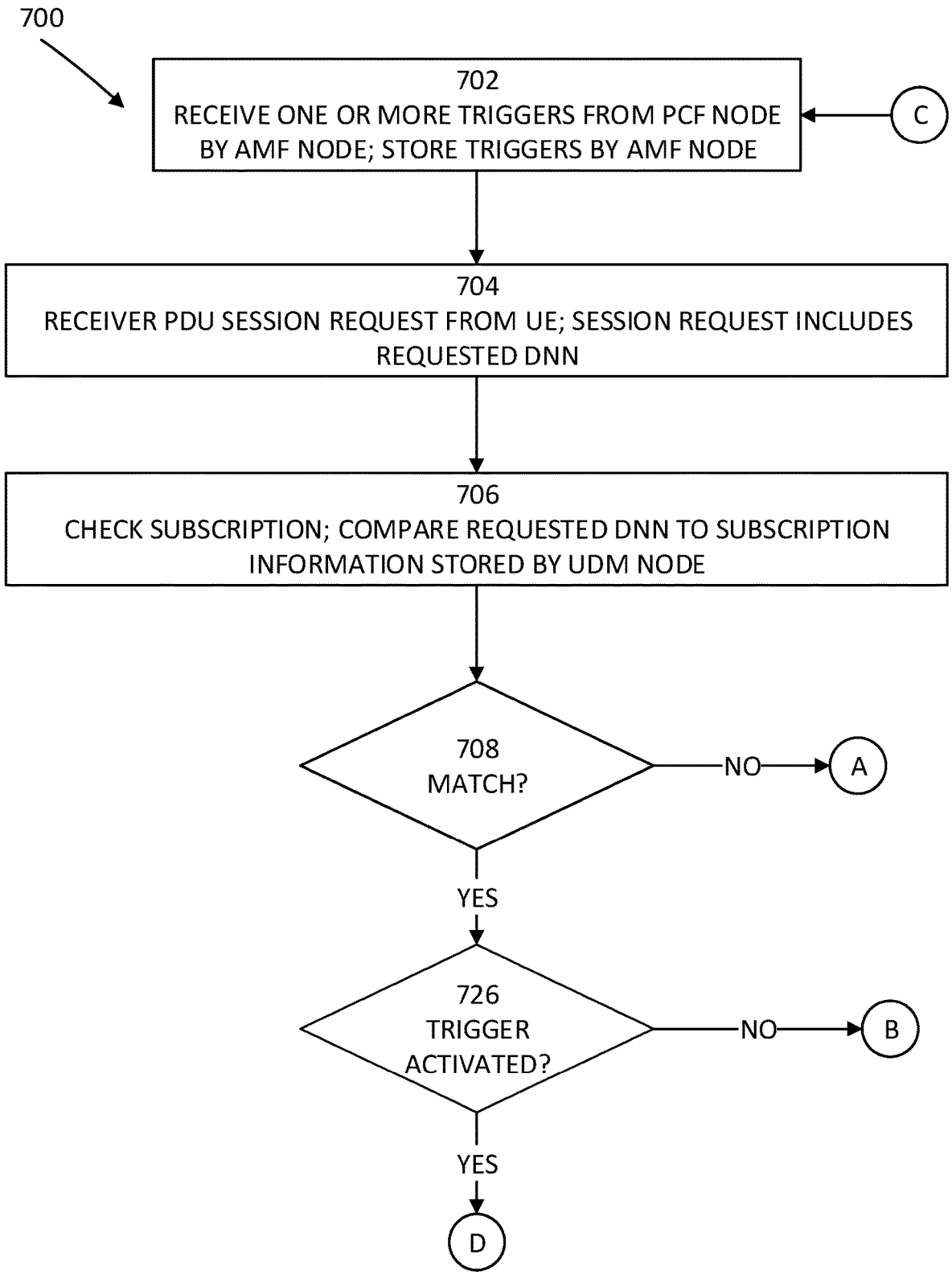
FIGS. 3-7 show a flow chart of exemplary operations for an AMF.

Returning to block 708 in FIG. 3, as previously described, if the requested DNN matches the subscription information in block 708, the method 700 advances to block 726. In block 726, a determination is made whether a trigger has been activated. In some embodiments, the trigger is one of a set of generic DNN manipulation triggers or a set of UE unique manipulation triggers. If a trigger has not been activated, the method 700 advances to block 728 in FIG. 6.

In block 728, the requested DNN is transmitted by the AMF 20 to the NRF 50 for selection of an SMF. In block 730, a notification of the selected SMF is received by the AMF 20 from the NRF 50. In block 731, the PDU session establishment request is forwarded to the selected SMF. In block 732, the PDU session is established between the UE 12 and the selected SMF.

Figure 4:
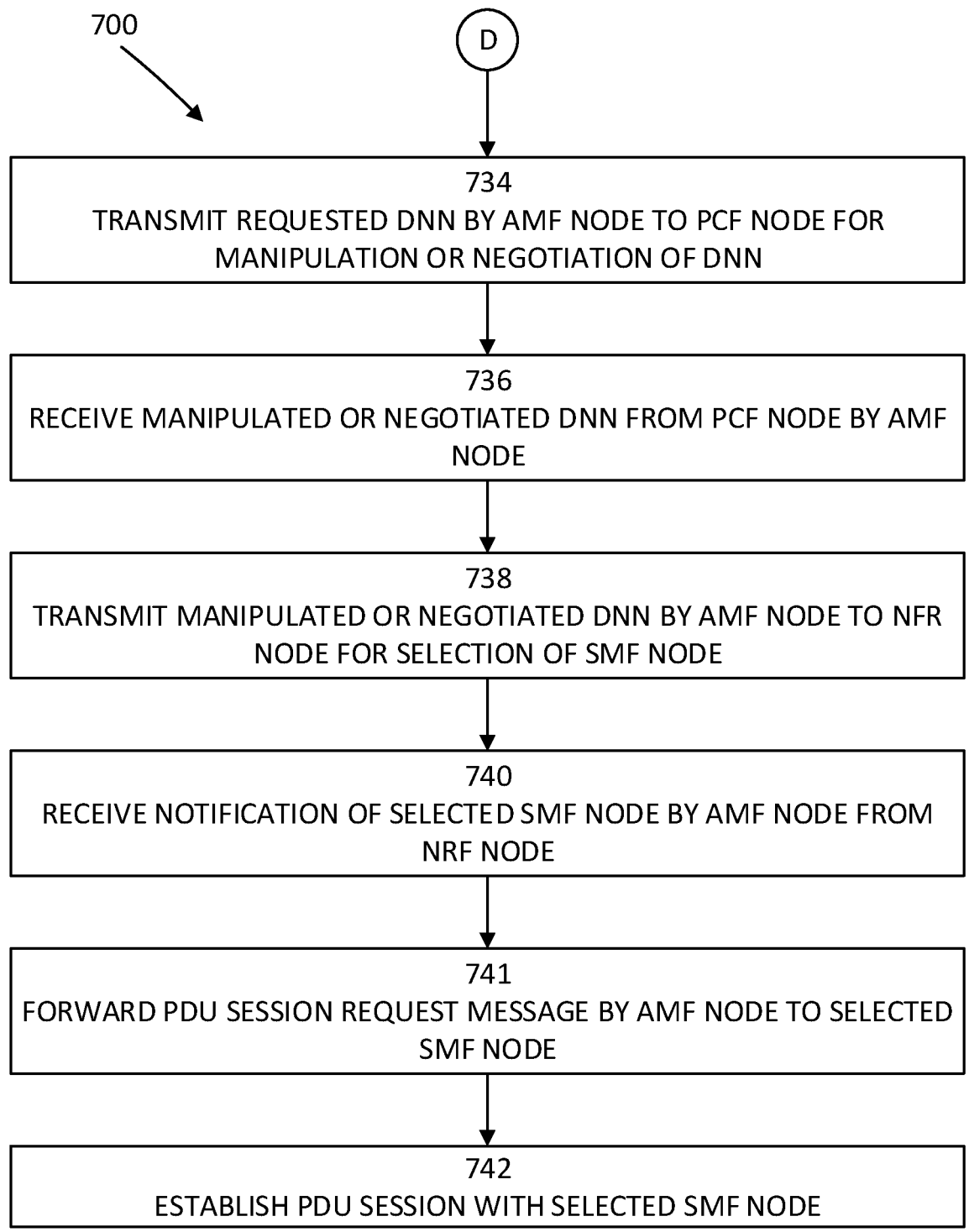
Figure 5:
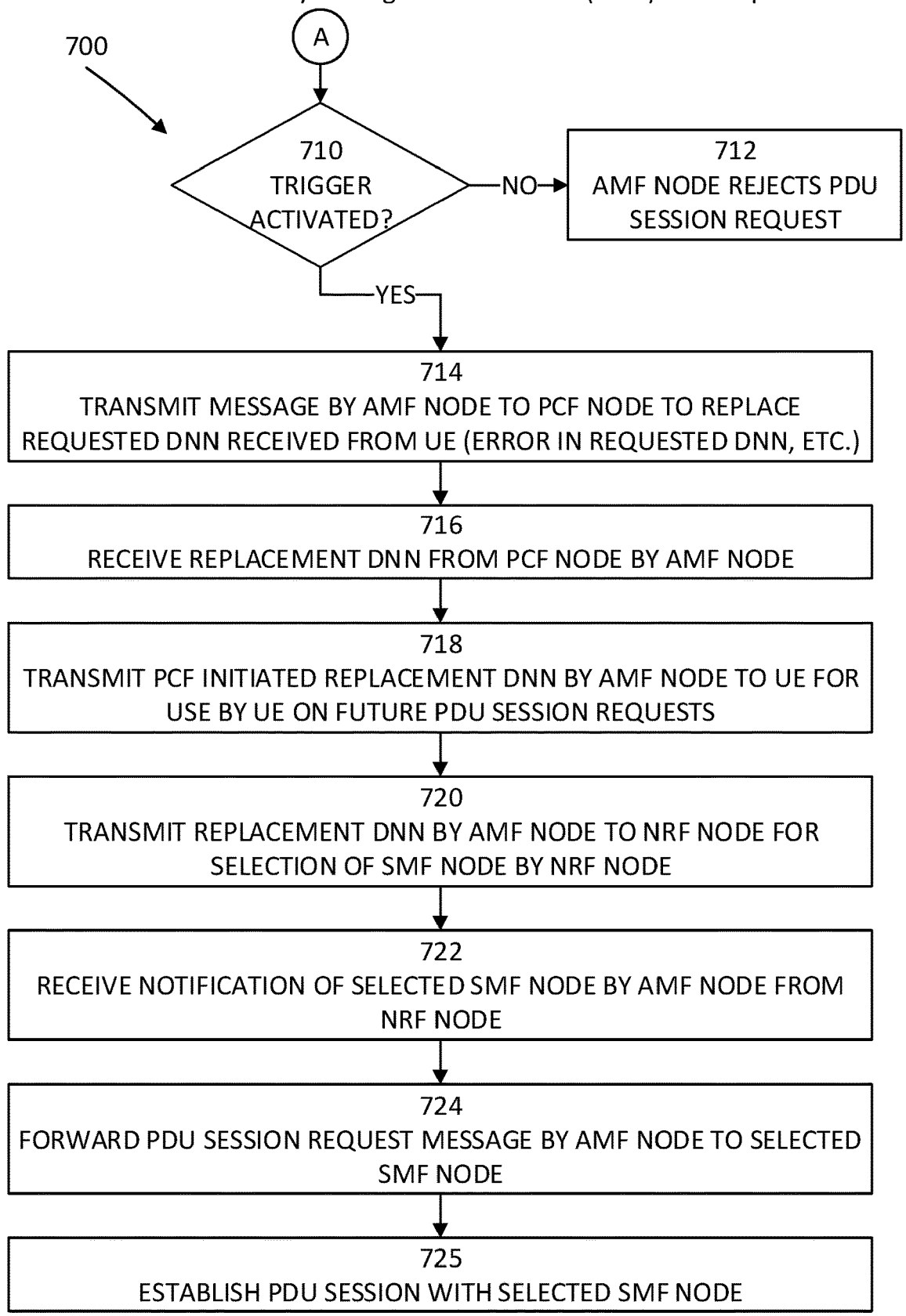
Figure 6:
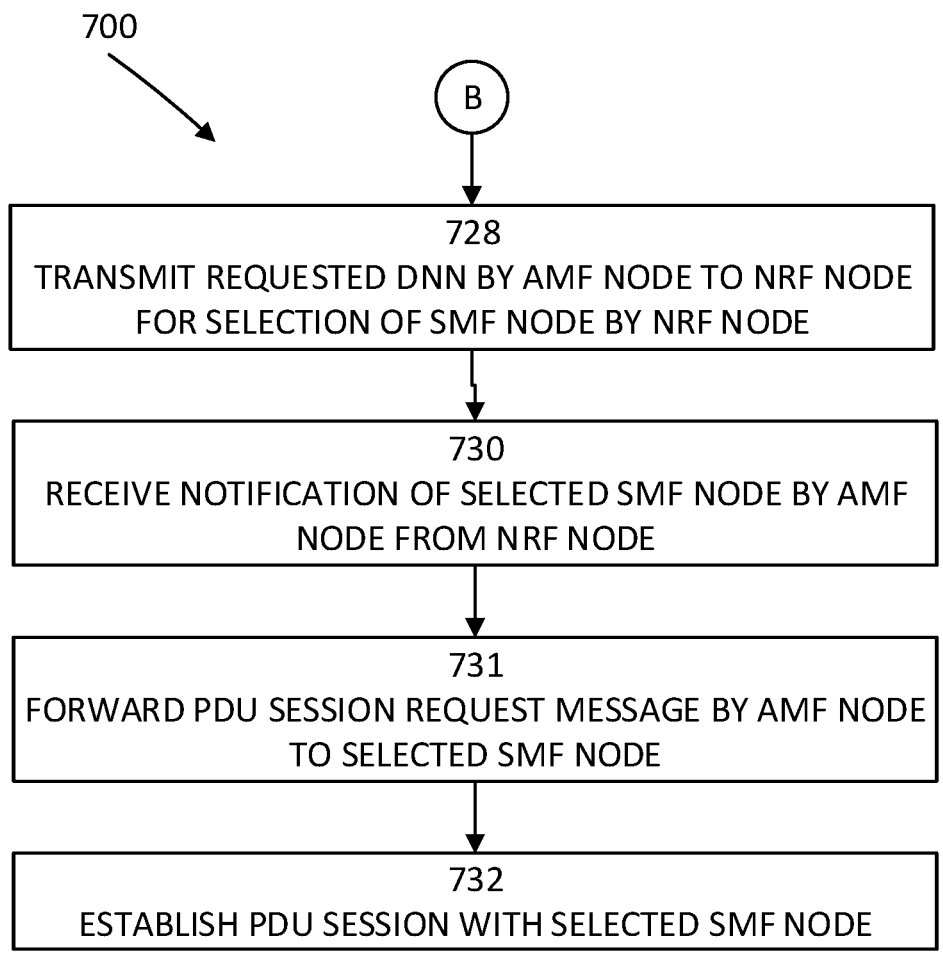

Returning to block 726 in FIG. 3, if a determination is made that a trigger is activated in block 726, the method 700 advances to block 734 in FIG. 4. In block 734, the requested DNN is transmitted to the PCF 30 for manipulation or negotiation of the requested DNN in response to the requested DNN matching the subscription information and the trigger being activated. In block 736, a manipulated DNN 736 or negotiated DNN to replace the requested DNN is received from the PCF 30 in response to the trigger being activated and there being a match between the requested DNN and the subscription information. In block 738, the manipulated or negotiated DNN is transmitted by the AMF 20 to an NRF 50 for selection of an SMF. In block 740, notification of the selected SMF is received by the AMF 20 from the NRF 50. In block 741, the PDU session establishment request message is forwarded by the AMF 20 to the selected SMF. In block 742, the PDU session is established between the UE 12 and the selected SMF.

Figure 7:
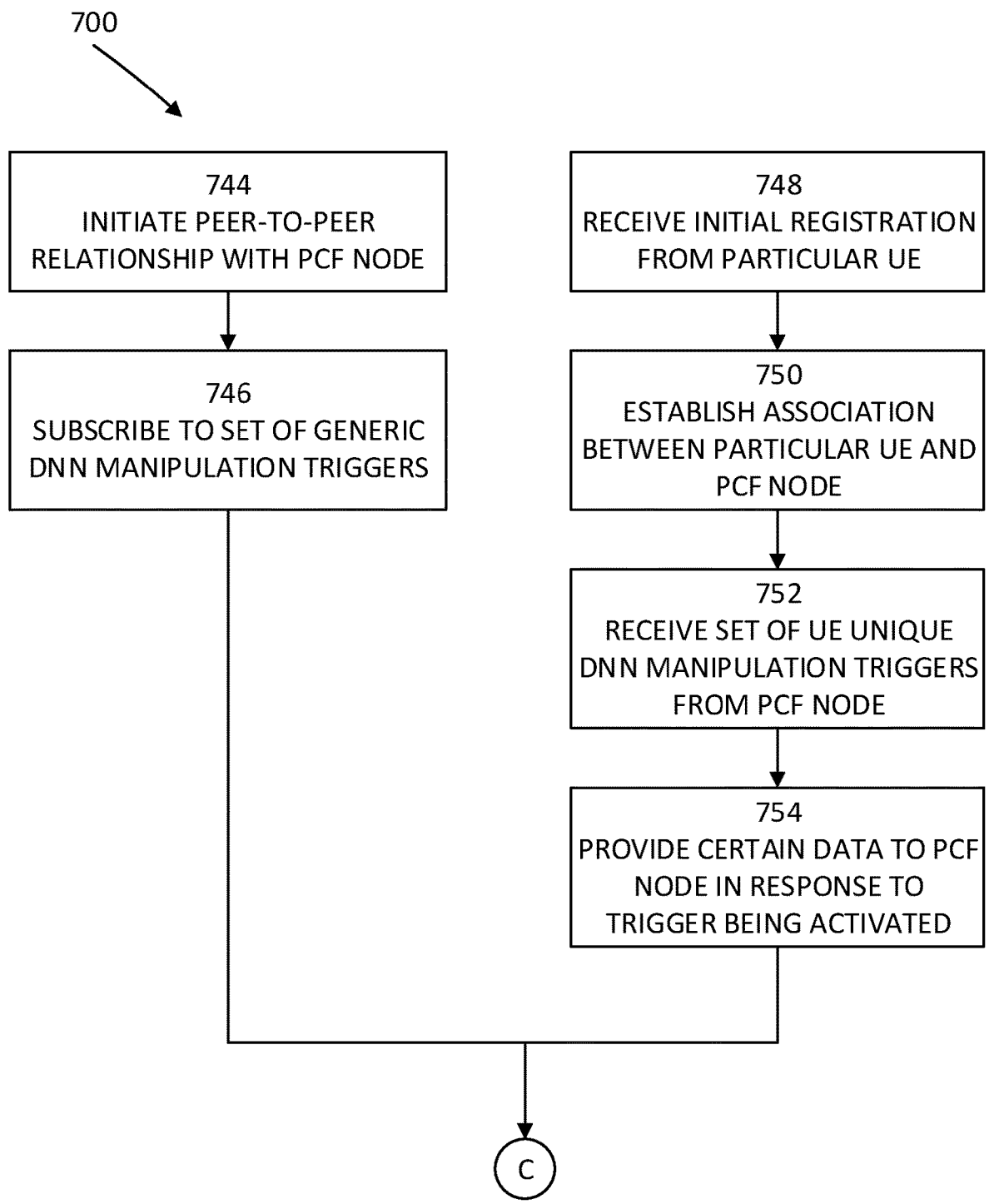

Referring to FIG. 7, FIG. 7 describes how the one or more triggers are received by the AMF 20 in block 702. In accordance with some embodiments, the one or more triggers include a set of generic DNN manipulation triggers and a set of UE unique DNN manipulation triggers. In block 744, a peer-to-peer relationship is established by the AMF 20 with a PCF 30. In block 746, the AMF 20 subscribes to the set of generic DNN manipulation triggers from the PCF 30. As previously described, in accordance with an embodiment, the generic DNN manipulation triggers are received by the AMF 20 and stored by the AMF 20. As previously described, examples of a set of generic DNN manipulation triggers include but are not necessarily limited to parts of a permanent equipment identifier (PEI) identifying a specific range of UE and/or a subscriber permanent identifier (SUPI) range. A trigger is activated in response to at least one of the PEI parts being within the specific range of UE or the SUPI being within the SUPI range. In block 748, an initial registration from a particular UE 12 is received by the AMF 20. In block 750, an association is established between the AMF 20 and the PCF 30 for the particular UE 12. In block 752, the set of UE unique DNN manipulation triggers are received from the PCF 30 by the AMF 20. In block 754, certain data is provided by the AMF 20 to the PCF 30 in response to one of the set of UE unique DNN manipulation triggers being activated or matched. As previously described, the set of UE unique manipulation triggers are based on one more characteristics of a particular UE. Examples of the one or more UE characteristics include but are not necessarily limited to the GPSI (MSISDN) of the particular UE, the geographic location of the particular UE, and a requested DNN included in a PDU session establishment request from a particular UE 12. A trigger is activated in response to one of the UE characteristics matching a preset value.

The set of generic DNN manipulation triggers and the set of UE unique DNN manipulation triggers are stored (block 702) separately by the AMF 20. Activation of any of the triggers is determined or checked during establishment of each PDU session before selection of an SMF.

With the current solution in 3GPP to use extension/decoration of DNNs as a mean to select specific SMFs has, as outlined above, the unfortunate effect that the extended/decorated needs to be handled as ordinary DNNs although they in other aspects will have the same characteristics as the non-extended/decorated original DNNs. This may result in a large amount of DNNs in the UEs subscription data just for the purpose of SMF selection or require local configuration in each SMF, causing an increase of OPEX. It furthermore requires update of subscription data or requires local configuration each time a new way of selecting SMFs is needed. This solution will cost, doesn't scale and is inflexible.

The following describes the solution presented herein and how this solution changes the basic session establishment process. In particular, the solution presented herein solves the problem caused by the scenarios of FIGS. 1-7, which is that such use of an extension/decoration of DNNs as a means to select specific SMFs causes the extended/decorated DNNs to be handled as ordinary DNNs, even though in other aspects they have the same characteristics as the non-extended/non-decorated DNNs. This may result in a large amount of DNNs in the UEs subscription data for the purpose of SMF selection, which cause an increase in operating costs, as well as requires an update of the subscription data each time a new way of selecting the SMF is needed, which increases cost, does not scale, and is inflexible. The solution presented herein alleviates these issues.

Figure 8:
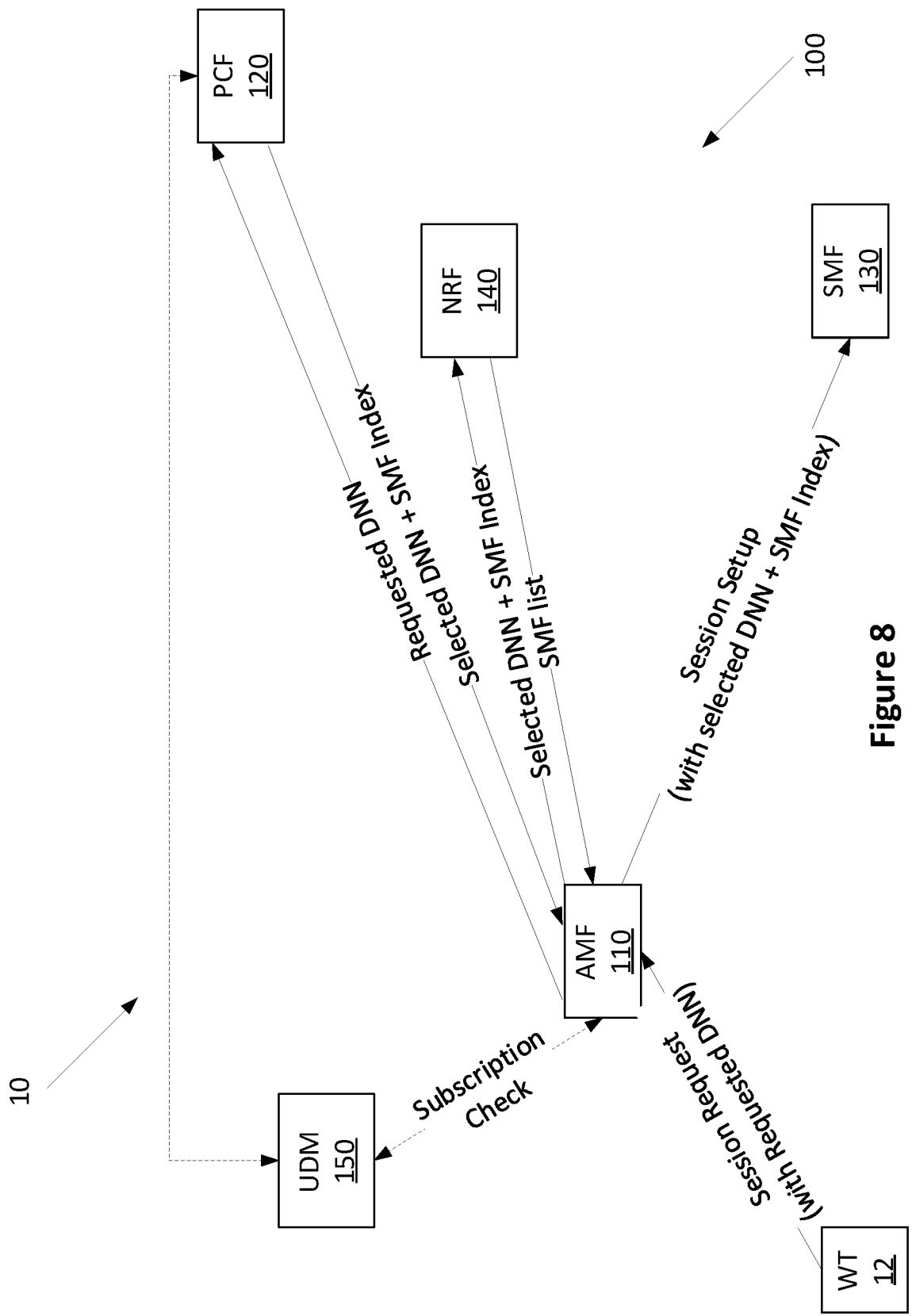
FIG. 8 shows a diagram of a communications network according to exemplary embodiments of the solution presented herein.

FIG. 8 shows a communication network 10 comprising a wireless terminal 12 in communication with a Core Network (CN) node 100 according to exemplary embodiments of the solution presented herein. WT 12 may comprise any remote device configured to communicate via a wireless link, e.g., a User Equipment (UE), cellular telephone, a Machine-Type Communication (MTC) device, etc. While not shown in FIG. 1, it will be appreciated that in practice, WT 12 communicates with the CN node 100 via a wireless access point, e.g., a Base Station.

CN node 100 comprises multiple NFs 110-150 that interact to establish a connection Protocol Data Unit (PDU) session upon request from the WT 12. These functional entities include, but are not limited to, AMF 110, PCF 120, SMF 130, NRF 140, and UDM 150. While each of these NFs generally has the same functions discussed above with respect to AMF 20, PCF 30, UDM 40, NRF 50, and the discussed SMF, the following details how these NFs differ from the general functional aspects discussed above. Broadly, the solution presented herein enables the CN node 100 to dynamically select the SMF 130 from the requested DNN and session-specific information (i.e., information specific to the requested PDU session, the subscriber requesting the PDU session, and/or the WT 12 requesting the PDU session). By considering the session-specific information as well as the requested DNN included with the PDU session establishment request, the solution presented herein limits the available pool of SMFs 130 for a particular PDU session, while simultaneously providing signaling for such. As used herein, "session-specific information" refers to information stored in the PCF 120, or provided by other entities in the CN 100, that identifies or otherwise defines any device-specific characteristics (e.g., device capabilities, device ID, device location, etc.), any subscriber-specific characteristics (e.g., subscriber ID, subscription, etc.), any capabilities of the SMF(s) being considered to be included in the list associated with the SMF index, and/or one or more heuristic analysis capabilities, e.g., historical data from past UE behavior (e.g., mobility pattern) and/or usage (e.g., Deep Packet Inspection (DPI)) that may be used to select the SMF the next time that particular UE comes back to the CN.

Figure 9:
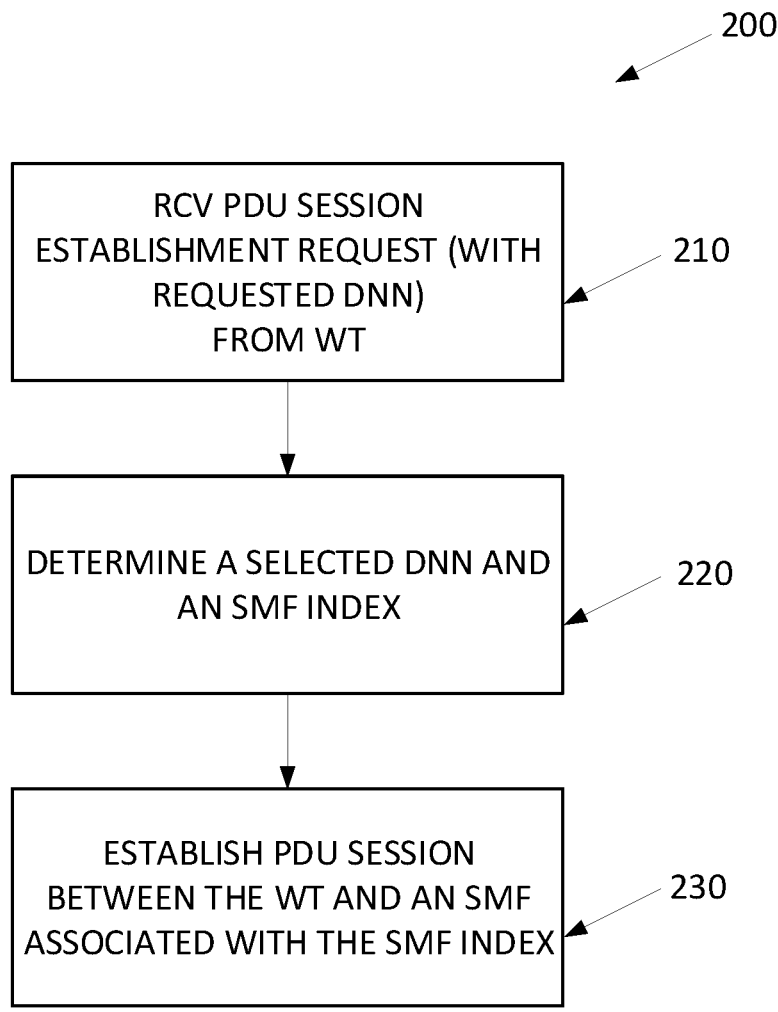
FIG. 9 shows a flow chart of operations for the CN according to exemplary embodiments of the solution presented herein.

FIG. 9 shows one exemplary method 200 implemented by CN node 100. Method 200 comprises receiving a PDU session establishment request from the WT 12, where the PDU session establishment request includes a requested DNN (block 210). Responsive to the requested DNN and to session-specific information, the CN node 100 determines a selected DNN and an SMF index, where the SMF index corresponds to one or more SMFs 130, and where each of said one or more SMFs is registered with the NRF 140 according to a corresponding SMF profile (block 220). The method 200 further comprises the CN node 100 establishing a PDU session between the WT 12 and a selected SMF 130 selected from the one or more SMFs 130 corresponding to the SMF index and responsive to the selected DNN and to the SMF index (block 230).

Figure 10:
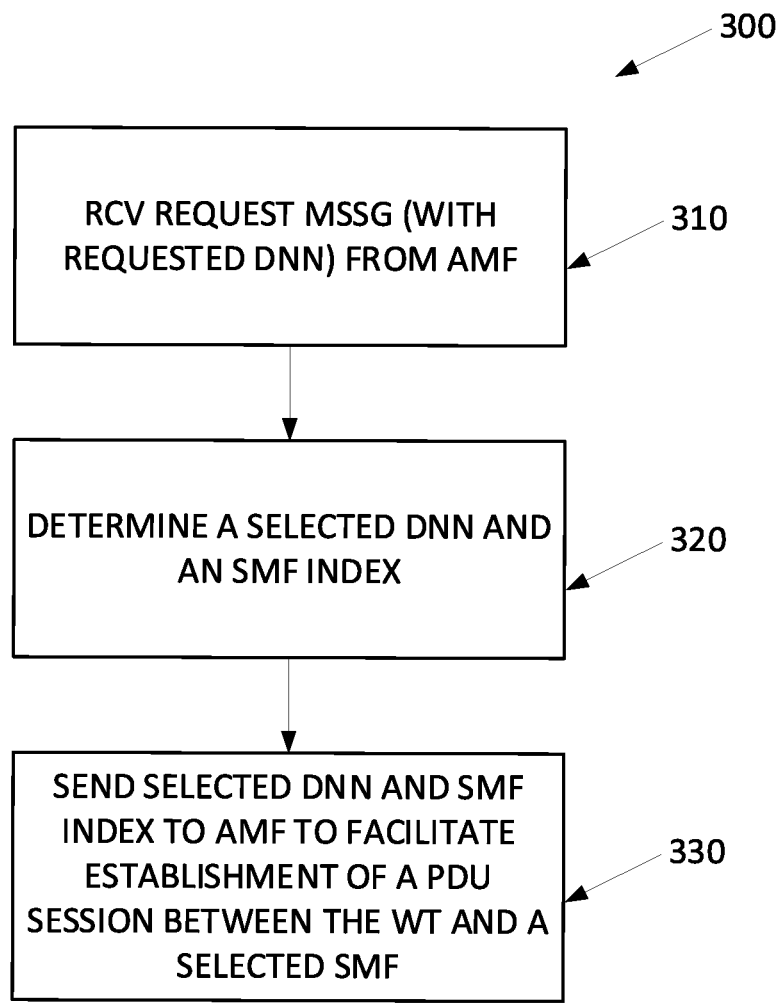
FIG. 10 shows a flow chart of operations for the PCF according to exemplary embodiments of the solution presented herein.
Figure 11:
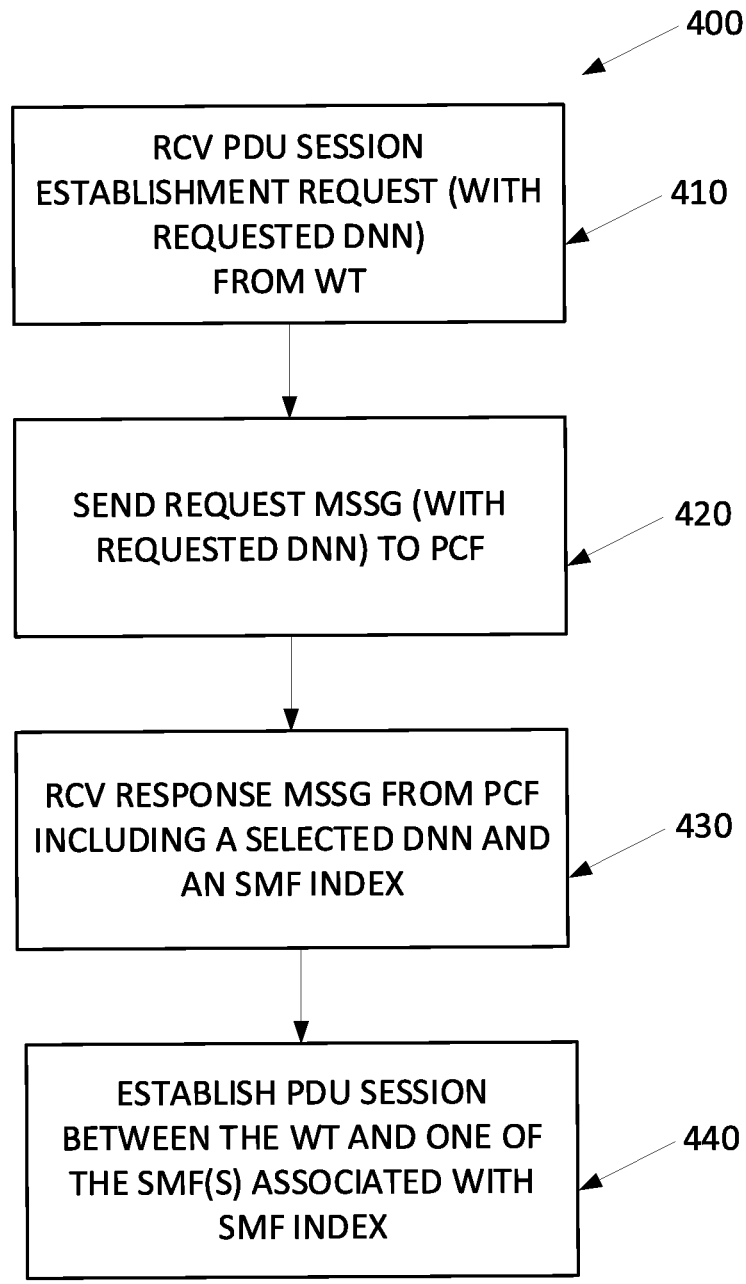
FIG. 11 shows a flow chart of operations for the AMF according to exemplary embodiments of the solution presented herein.

More particularly, different network functions within the CN node 100 play a part in implementing the solution presented herein. FIG. 10 shows an exemplary method 300 implemented by the PCF 120, while FIG. 11 shows an exemplary method 400 implemented by the AMF 110. The following discusses methods 300 and 400 jointly to illustrate the interaction between the AMF 110 and the PCF 120. The AMF 110 receives a PDU session establishment request from WT 12, where the PDU session establishment request includes a requested DNN (block 410), and sends a request message with the requested DNN to the PCF 120 (block 420). The PCF 120 receives the request message from the AMF 110 (block 310). Responsive to the request message and to session-specific information, the PCF 120 determines a selected DNN and an SMF index corresponding to one or more SMFs 130 (block 320). Each of the one or more SMFs 130 is registered with the NRF 140 according to a corresponding SMF profile. PCF 120 then sends a response message containing the selected DNN and the SMF index to the AMF 110 to facilitate the selection of one of the SMFs 130 associated with the SMF index for establishment of the PDU session between the AMF 110 and the selected SMF 130 (block 330). The AMF 110 receives the response message from the PCF 120 (block 430), and responsive to the reception of the response message, establishes a PDU session between the WT 12 and a selected one of the one or more SMFs 130 associated with the SMF index (block 440).

Figure 12:
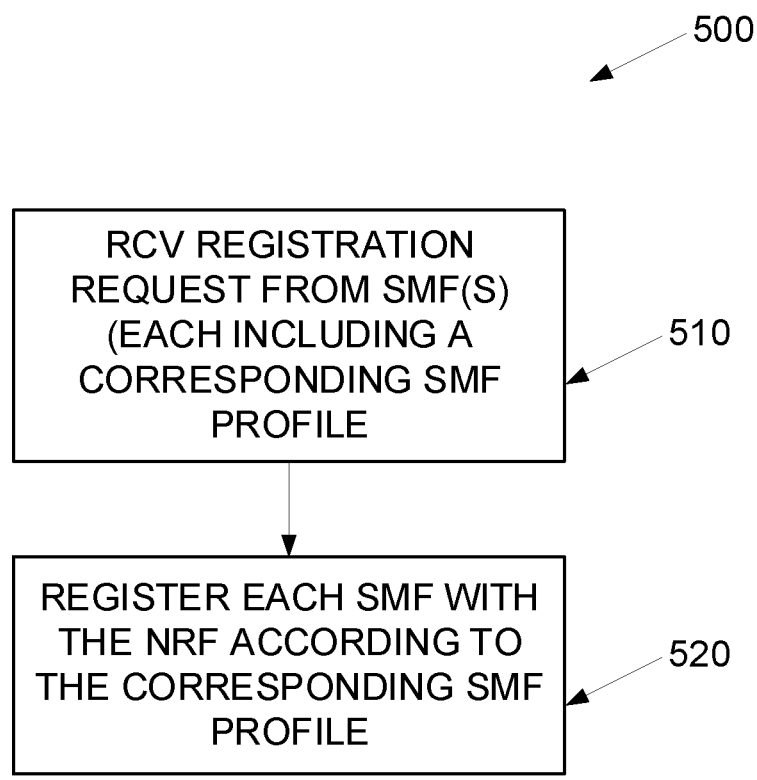
FIG. 12 shows a flow chart of operations for the NRF according to exemplary embodiments of the solution presented herein.

FIG. 12 shows an exemplary method 500 implemented by the NRF 140 according to exemplary embodiments presented herein. Method 500 comprises the NRF 140 receiving a registration request from each of one or more SMFs 130 in the CN node 100, where each registration request includes a corresponding SMF profile defining one or more sets of SMF indexes supported by the corresponding SMF 130 (block 510). The method 500 further comprises registering each SMF 130 with the NRF 140 according to the corresponding SMF profile (block 520).

Once this registration is complete, the NRF also participates in a subsequent PDU session establishment by providing the AMF 110 with a list of the SMF(s) 130 from which the AMF 110 selects one SMF 130 for the PDU session. More particularly, the NRF 140 receives from the AMF 110 the selected DNN and the SMF index determined by the PCF 120. Responsive to the selected DNN and the SMF index, the NRF 140 sends, to the AMF 110, a list of SMFs including one or more SMFs associated with the SMF index to facilitate establishment by the AMF 110 of the PDU session between the WT 12 and a selected one of the one or more SMFs. The AMF 110 selects one of the SMFs from the one or more SMFs included in the list of SMFs received from the NRF 140, and establishes the PDU session between the WT 12 and the selected SMF 130.

Figure 13:
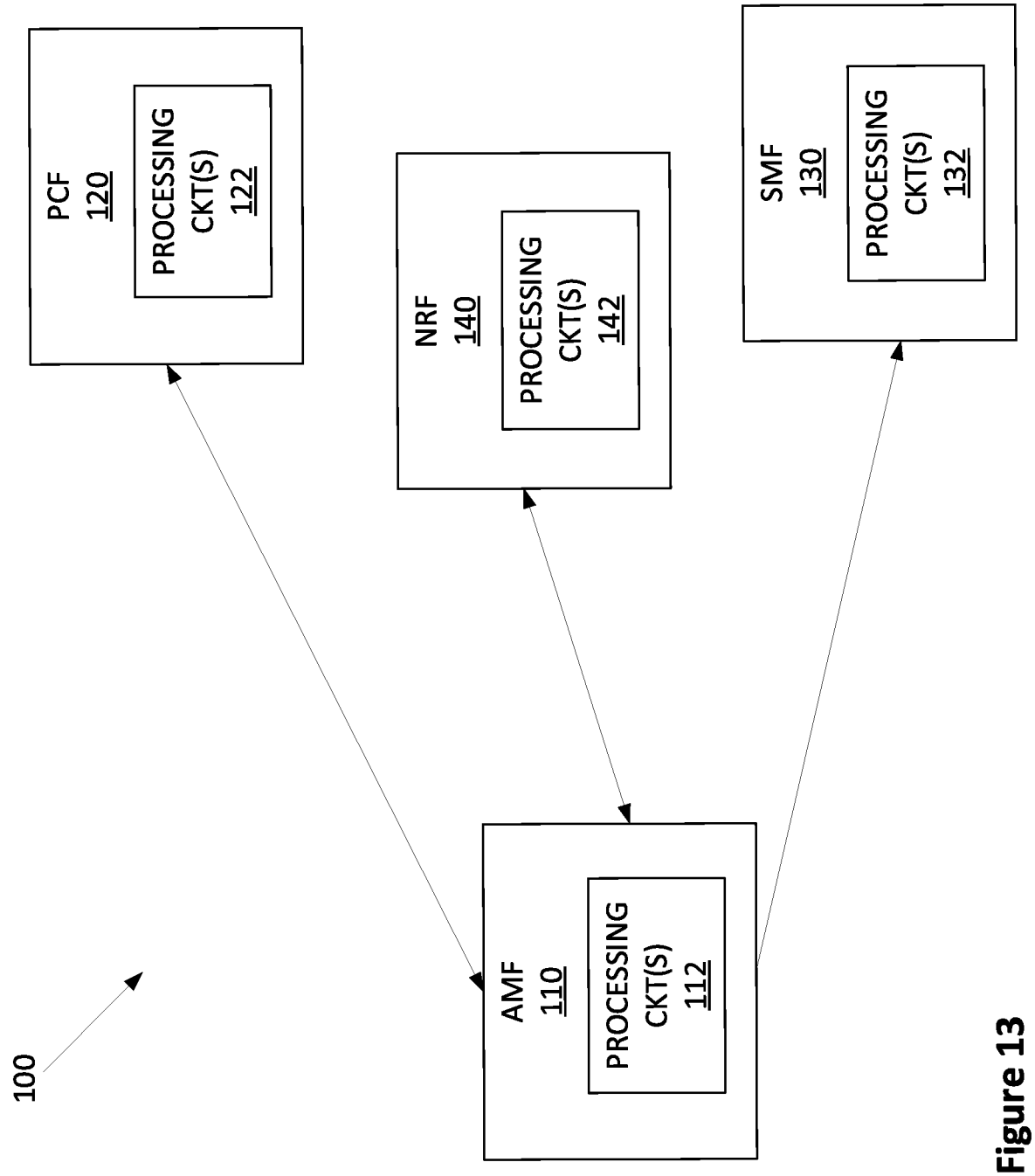
FIG. 13 shows a block diagram of the NFs in the CN according to exemplary embodiments of the solution presented herein.
Figure 14:
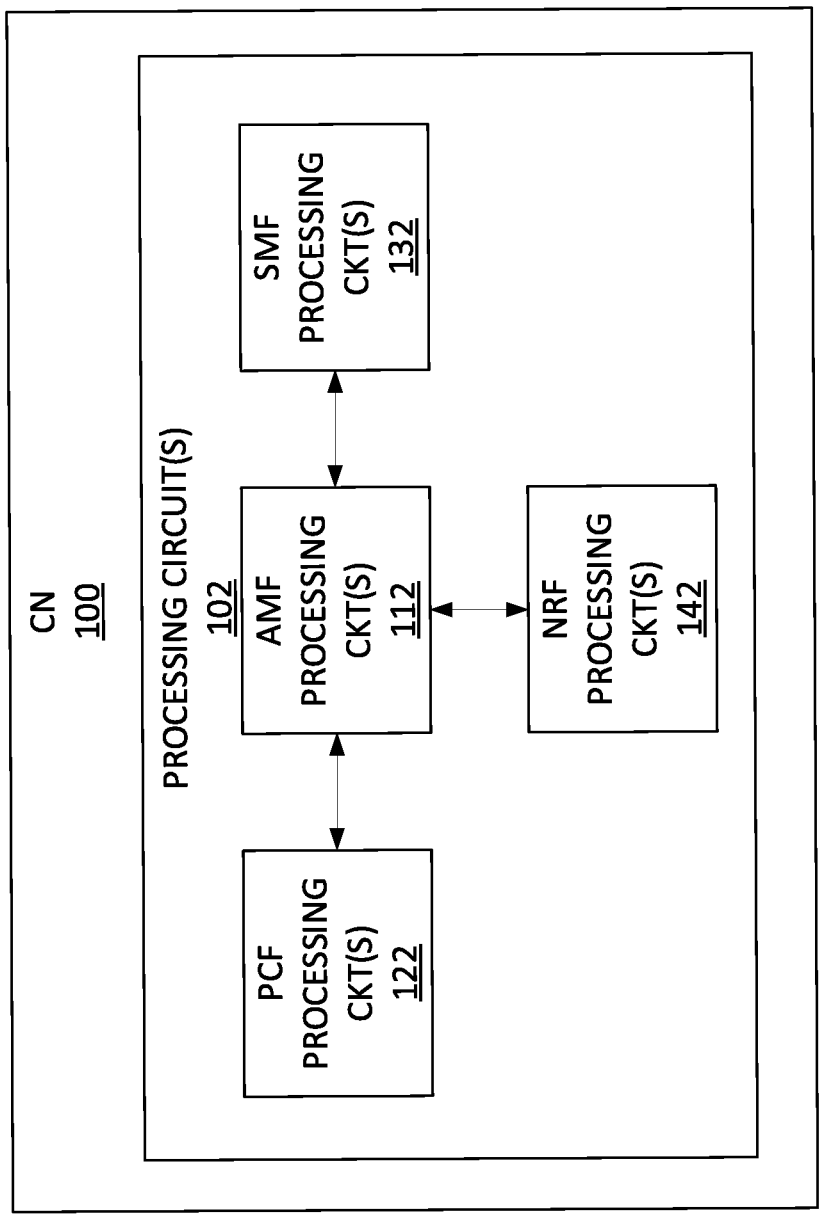
FIG. 14 shows a block diagram of the CN according to exemplary embodiments of the solution presented herein.

FIG. 13 shows an exemplary block diagram of the CN node 100, including exemplary block diagrams for each of the AMF 110, PCF 120, SMF 130, and NRF 140. Each NF includes one or more processing circuits configured to implement the corresponding method. In accordance with an example, the NFs are embodied in one or more different CN nodes. For example, AMF 110 comprises one or more processing circuits 112 configured to implement the method 400 and all corresponding AMF method steps as disclosed herein, while PCF 120 comprises one or more processing circuits 122 configured to implement the method 300 and NRF 140 comprises one or more processing circuits 142 configured to implement the method 500, and all corresponding PCF and NRF method steps as disclosed herein. Similarly, SMF 130 comprises one or more processing circuits 132 configured to implement the SMF processes discussed herein. Collectively, CN 100 comprises one or more processing circuits 112, 122, 132, 142, as shown in FIG. 14, where these processing circuits 112, 122, 132, 142 are configured to implement the method 200 and all corresponding CN method steps as disclosed herein. It will be appreciated that in some embodiments, one or more of the processing circuits 112, 122, 132, 142 may be implemented as modules within the CN 100.

The solution presented herein may further be illustrated in view of the current procedures detailed relative to FIGS. 1-7. For example, block 720 of FIG. 5 may be changed to show the SMF transmits the replacement DNN and the SMF Index to the NRF for selection of a list of SMFs by the NRF, where the list of SMFs includes one or more SMFs associated with the SMF index. Then, in block 722, the NRF sends the list of SMFs to the AMF, and the AMF selects one of the SMFs in the list for PDU session establishment.

Similarly, in FIG. 4 block 736 may change to the reception of a manipulated DNN or negotiated DNN (to replace the request DNN) together with an SMF index in response to the trigger being activated and there being a match between the requested DNN and the subscription information. In block 738, the manipulated or negotiated DNN together with the SMF index is transmitted by the AMF to the NRF for selection of a list of SMFs, the list including one or more SMFs associated with the SMF index. In block 740, notification of the list of SMFs is received by the AMF from the NRF, and the AMF selects on SMF from the candidates in the list for PDU session establishment.

The following outlines one example of the AMF selecting an SMF for a PDU session:
1. During the UE registration procedure the UDM provides a list of valid DNNs that is part of the subscription.
2. The AMF contacts the PCF during the same registration procedure and the PCF could "arm" the AMF with triggers (e.g., for the AMF to contact the PCF if the requested DNN doesn't match the subscribed DNN, or any valid DNNs that the UE requests regardless of match).
3. During PDU Session Establishment, the UE could provide a DNN, e.g., the requested DNN.
4. The AMF matches the requested DNN towards the list of subscribed DNNs.
5. If there is no match between subscribed and requested DNN then the AMF checks for PCF triggers (received at step 2).
   a. If there are no triggers, the PDU Session attempt is rejected and a response back to the UE is sent.
   b. If there are triggers, the AMF contacts the PCF and the PCF returns a selected DNN+SMF index.
6. Instead of step 5, if there is a match, the AMF also checks for PCF triggers (received at step 2).
   a. If there are no triggers then the PDU Session attempt continues using the requested DNN onwards only.
   b. If there are triggers, the AMF contacts the PCF and the PCF returns a selected DNN+SMF index.
7. Once the AMF decides to continue with the procedure, the NRF is contacted using either the requested DNN (step 6a) or the selected DNN+SMF index (steps 5b or 6b).
8. The NRF return a list of SMFs (corresponding to the input selected in step 7) to the AMF, where that list comprises 1-N SMFs.
9. Once the AMF receives the list of SMF(s), the AMF selects one of the SMF(s) in the list.
10. The AMF sends the PDU Session establishment message to the selected SMF.

In conclusion, to support service-based NF selection in 5GC at PDU session establishment, the PCF provides an SMF index to the AMF across N15 (as part of the signaling between the AMF and the PCF during PDU session establishment (see 3GPP CRs in the appendix). The SMF index is mapped by the PCF to a locally defined configuration in order to apply specific NF selection strategies that take into account any available information in the PCF (i.e., "session-specific information"). Including the SMF index in the NF profile for, e.g., NFs of type SMF and UPF, and by providing such from the PCF towards the AMF and further to the SMFs, it is possible for the PCF to control the selection of such NFs. The SMF index could change dynamically and is provisioned through the PCF, although coordinated by the operation on the network level. Examples of how this SMF index may be used by the CN include, but are not limited to: (1) the AMF using the SMF index in conjunction with the DNN and the S-NSSAI to find the best suited IoT SMF (e.g., the SMF index indicates a Type Allocation Code (TAC)); (2) the SMF may use the SMF index to select a dedicated UP for pre-paid subscribers (e.g., the SMF index indicates Changing Characteristics (CC)).

Additional explanation is provided below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 15:
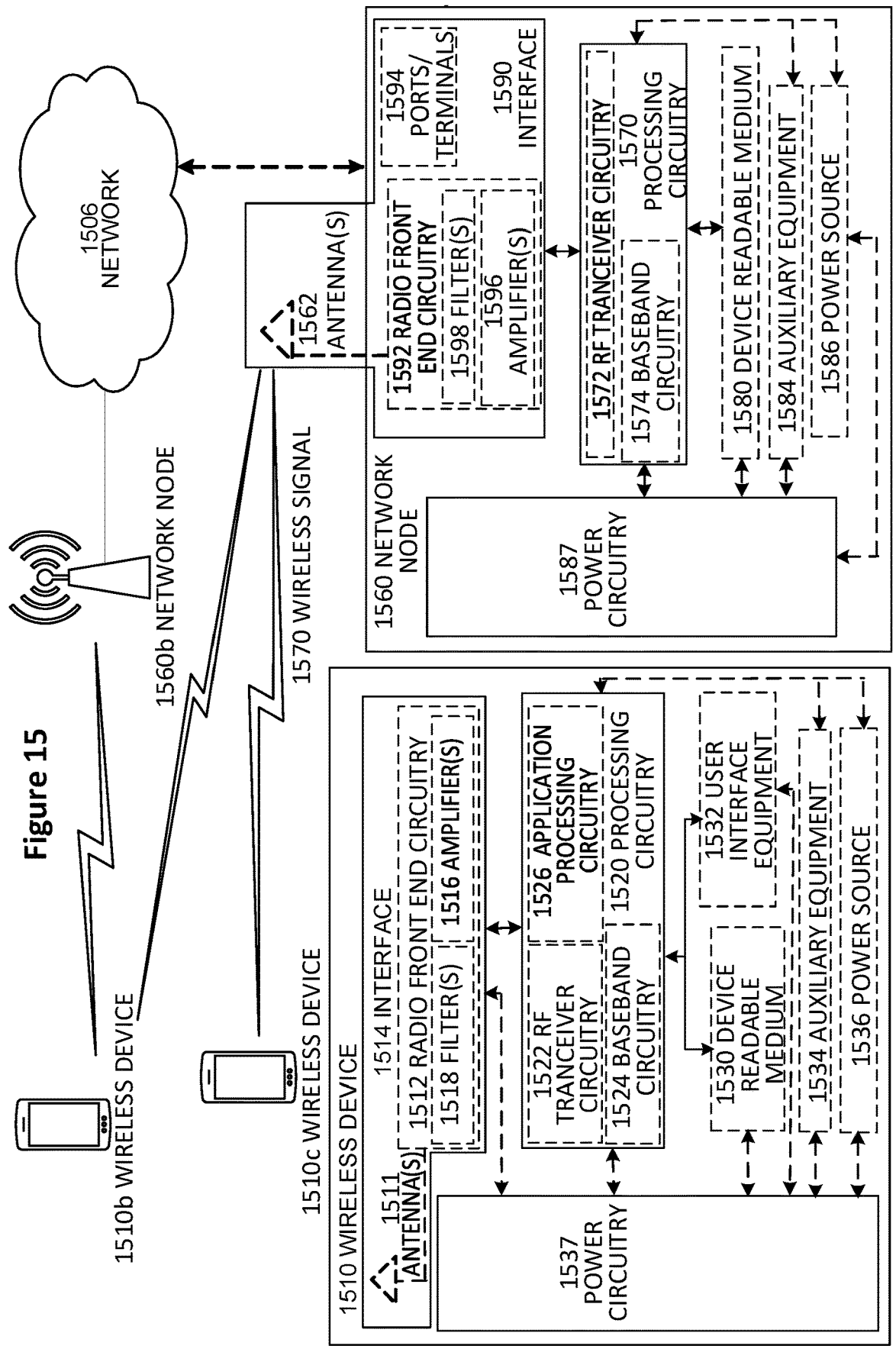
FIG. 15 is a block diagram of a wireless network in accordance with some embodiments.

Although the subject matter described herein may be implemented in any appropriate type of system using any suitable components, the embodiments disclosed herein are described in relation to a wireless network, such as the example wireless network illustrated in FIG. 15. For simplicity, the wireless network of FIG. 15 only depicts network 1506, network nodes 1560 and 1560b, and WDs 1510, 1510b, and 1510c. In practice, a wireless network may further include any additional elements suitable to support communication between wireless devices or between a wireless device and another communication device, such as a landline telephone, a service provider, or any other network node or end device. Of the illustrated components, network node 1560 and wireless device (WD) 1510 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1506 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1560 and WD 1510 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)), etc. Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 15, network node 1560 includes processing circuitry 1570, device readable medium 1580, interface 1590, auxiliary equipment 1584, power source 1586, power circuitry 1587, and antenna 1562. Although network node 1560 illustrated in the example wireless network of FIG. 15 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1560 are depicted as single boxes located within a larger box, or nested within multiple boxes, in practice, a network node may comprise multiple different physical components that make up a single illustrated component (e.g., device readable medium 1580 may comprise multiple separate hard drives as well as multiple RAM modules).

Similarly, network node 1560 may be composed of multiple physically separate components (e.g., a NodeB component and a RNC component, or a BTS component and a BSC component, etc.), which may each have their own respective components. In certain scenarios in which network node 1560 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1560 may be configured to support multiple radio access technologies (RATs). In such embodiments, some components may be duplicated (e.g., separate device readable medium 1580 for the different RATs) and some components may be reused (e.g., the same antenna 1562 may be shared by the RATs). Network node 1560 may also include multiple sets of the various illustrated components for different wireless technologies integrated into network node 1560, such as, for example, GSM, WCDMA, LTE, NR, WiFi, or Bluetooth wireless technologies. These wireless technologies may be integrated into the same or different chip or set of chips and other components within network node 1560.

Processing circuitry 1570 is configured to perform any determining, calculating, or similar operations (e.g., certain obtaining operations) described herein as being provided by a network node. These operations performed by processing circuitry 1570 may include processing information obtained by processing circuitry 1570 by, for example, converting the obtained information into other information, comparing the obtained information or converted information to information stored in the network node, and/or performing one or more operations based on the obtained information or converted information, and as a result of said processing making a determination.

Processing circuitry 1570 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1560 components, such as device readable medium 1580, network node 1560 functionality. For example, processing circuitry 1570 may execute instructions stored in device readable medium 1580 or in memory within processing circuitry 1570. Such functionality may include providing any of the various wireless features, functions, or benefits discussed herein. In some embodiments, processing circuitry 1570 may include a system on a chip (SOC).

In some embodiments, processing circuitry 1570 may include one or more of radio frequency (RF) transceiver circuitry 1572 and baseband processing circuitry 1574. In some embodiments, radio frequency (RF) transceiver circuitry 1572 and baseband processing circuitry 1574 may be on separate chips (or sets of chips), boards, or units, such as radio units and digital units. In alternative embodiments, part or all of RF transceiver circuitry 1572 and baseband processing circuitry 1574 may be on the same chip or set of chips, boards, or units In certain embodiments, some or all of the functionality described herein as being provided by a network node, base station, eNB or other such network device may be performed by processing circuitry 1570 executing instructions stored on device readable medium 1580 or memory within processing circuitry 1570. In alternative embodiments, some or all of the functionality may be provided by processing circuitry 1570 without executing instructions stored on a separate or discrete device readable medium, such as in a hard-wired manner. In any of those embodiments, whether executing instructions stored on a device readable storage medium or not, processing circuitry 1570 can be configured to perform the described functionality. The benefits provided by such functionality are not limited to processing circuitry 1570 alone or to other components of network node 1560, but are enjoyed by network node 1560 as a whole, and/or by end users and the wireless network generally.

Device readable medium 1580 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1570. Device readable medium 1580 may store any suitable instructions, data or information, including a computer program, software, an application including one or more of logic, rules, code, tables, etc. and/or other instructions capable of being executed by processing circuitry 1570 and, utilized by network node 1560. Device readable medium 1580 may be used to store any calculations made by processing circuitry 1570 and/or any data received via interface 1590. In some embodiments, processing circuitry 1570 and device readable medium 1580 may be considered to be integrated.

Interface 1590 is used in the wired or wireless communication of signalling and/or data between network node 1560, network 1506, and/or WDs 1510. As illustrated, interface 1590 comprises port(s)/terminal(s) 1594 to send and receive data, for example to and from network 1506 over a wired connection. Interface 1590 also includes radio front end circuitry 1592 that may be coupled to, or in certain embodiments a part of, antenna 1562. Radio front end circuitry 1592 comprises filters 1598 and amplifiers 1596. Radio front end circuitry 1592 may be connected to antenna 1562 and processing circuitry 1570. Radio front end circuitry may be configured to condition signals communicated between antenna 1562 and processing circuitry 1570. Radio front end circuitry 1592 may receive digital data that is to be sent out to other network nodes or WDs via a wireless connection. Radio front end circuitry 1592 may convert the digital data into a radio signal having the appropriate channel and bandwidth parameters using a combination of filters 1598 and/or amplifiers 1596. The radio signal may then be transmitted via antenna 1562. Similarly, when receiving data, antenna 1562 may collect radio signals which are then converted into digital data by radio front end circuitry 1592. The digital data may be passed to processing circuitry 1570. In other embodiments, the interface may comprise different components and/or different combinations of components.

In certain alternative embodiments, network node 1560 may not include separate radio front end circuitry 1592, instead, processing circuitry 1570 may comprise radio front end circuitry and may be connected to antenna 1562 without separate radio front end circuitry 1592. Similarly, in some embodiments, all or some of RF transceiver circuitry 1572 may be considered a part of interface 1590. In still other embodiments, interface 1590 may include one or more ports or terminals 1594, radio front end circuitry 1592, and RF transceiver circuitry 1572, as part of a radio unit (not shown), and interface 1590 may communicate with baseband processing circuitry 1574, which is part of a digital unit (not shown).

Antenna 1562 may include one or more antennas, or antenna arrays, configured to send and/or receive wireless signals. Antenna 1562 may be coupled to radio front end circuitry 1590 and may be any type of antenna capable of transmitting and receiving data and/or signals wirelessly. In some embodiments, antenna 1562 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1562 may be separate from network node 1560 and may be connectable to network node 1560 through an interface or port.

Antenna 1562, interface 1590, and/or processing circuitry 1570 may be configured to perform any receiving operations and/or certain obtaining operations described herein as being performed by a network node. Any information, data and/or signals may be received from a wireless device, another network node and/or any other network equipment. Similarly, antenna 1562, interface 1590, and/or processing circuitry 1570 may be configured to perform any transmitting operations described herein as being performed by a network node. Any information, data and/or signals may be transmitted to a wireless device, another network node and/or any other network equipment.

Power circuitry 1587 may comprise, or be coupled to, power management circuitry and is configured to supply the components of network node 1560 with power for performing the functionality described herein. Power circuitry 1587 may receive power from power source 1586. Power source 1586 and/or power circuitry 1587 may be configured to provide power to the various components of network node 1560 in a form suitable for the respective components (e.g., at a voltage and current level needed for each respective component). Power source 1586 may either be included in, or external to, power circuitry 1587 and/or network node 1560. For example, network node 1560 may be connectable to an external power source (e.g., an electricity outlet) via an input circuitry or interface such as an electrical cable, whereby the external power source supplies power to power circuitry 1587. As a further example, power source 1586 may comprise a source of power in the form of a battery or battery pack which is connected to, or integrated in, power circuitry 1587. The battery may provide backup power should the external power source fail. Other types of power sources, such as photovoltaic devices, may also be used.

Alternative embodiments of network node 1560 may include additional components beyond those shown in FIG. 15 that may be responsible for providing certain aspects of the network node's functionality, including any of the functionality described herein and/or any functionality necessary to support the subject matter described herein. For example, network node 1560 may include user interface equipment to allow input of information into network node 1560 and to allow output of information from network node 1560. This may allow a user to perform diagnostic, maintenance, repair, and other administrative functions for network node 1560.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1510 includes antenna 1511, interface 1514, processing circuitry 1520, device readable medium 1530, user interface equipment 1532, auxiliary equipment 1534, power source 1536 and power circuitry 1537. WD 1510 may include multiple sets of one or more of the illustrated components for different wireless technologies supported by WD 1510, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD 1510.

Antenna 1511 may include one or more antennas or antenna arrays, configured to send and/or receive wireless signals, and is connected to interface 1514. In certain alternative embodiments, antenna 1511 may be separate from WD 1510 and be connectable to WD 1510 through an interface or port. Antenna 1511, interface 1514, and/or processing circuitry 1520 may be configured to perform any receiving or transmitting operations described herein as being performed by a WD. Any information, data and/or signals may be received from a network node and/or another WD. In some embodiments, radio front end circuitry and/or antenna 1511 may be considered an interface.

As illustrated, interface 1514 comprises radio front end circuitry 1512 and antenna 1511. Radio front end circuitry 1512 comprise one or more filters 1518 and amplifiers 1516. Radio front end circuitry 1514 is connected to antenna 1511 and processing circuitry 1520 and is configured to condition signals communicated between antenna 1511 and processing circuitry 1520. Radio front end circuitry 1512 may be coupled to or a part of antenna 1511. In some embodiments, WD 1510 may not include separate radio front end circuitry 1512; rather, processing circuitry 1520 may comprise radio front end circuitry and may be connected to antenna 1511. Similarly, in some embodiments, some or all of RF transceiver circuitry 1522 may be considered a part of interface

1514. Radio front end circuitry 1512 may receive digital data that is to be sent out to other network nodes or WDs via a wireless connection. Radio front end circuitry 1512 may convert the digital data into a radio signal having the appropriate channel and bandwidth parameters using a combination of filters 1518 and/or amplifiers 1516. The radio signal may then be transmitted via antenna 1511. Similarly, when receiving data, antenna 1511 may collect radio signals which are then converted into digital data by radio front end circuitry 1512. The digital data may be passed to processing circuitry 1520. In other embodiments, the interface may comprise different components and/or different combinations of components.

Processing circuitry 1520 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1510 components, such as device readable medium 1530, WD 1510 functionality. Such functionality may include providing any of the various wireless features or benefits discussed herein. For example, processing circuitry 1520 may execute instructions stored in device readable medium 1530 or in memory within processing circuitry 1520 to provide the functionality disclosed herein.

As illustrated, processing circuitry 1520 includes one or more of RF transceiver circuitry 1522, baseband processing circuitry 1524, and application processing circuitry 1526. In other embodiments, the processing circuitry may comprise different components and/or different combinations of components. In certain embodiments processing circuitry 1520 of WD 1510 may comprise a SOC. In some embodiments, RF transceiver circuitry 1522, baseband processing circuitry 1524, and application processing circuitry 1526 may be on separate chips or sets of chips. In alternative embodiments, part or all of baseband processing circuitry 1524 and application processing circuitry 1526 may be combined into one chip or set of chips, and RF transceiver circuitry 1522 may be on a separate chip or set of chips. In still alternative embodiments, part or all of RF transceiver circuitry 1522 and baseband processing circuitry 1524 may be on the same chip or set of chips, and application processing circuitry 1526 may be on a separate chip or set of chips. In yet other alternative embodiments, part or all of RF transceiver circuitry 1522, baseband processing circuitry 1524, and application processing circuitry 1526 may be combined in the same chip or set of chips. In some embodiments, RF transceiver circuitry 1522 may be a part of interface 1514. RF transceiver circuitry 1522 may condition RF signals for processing circuitry 1520.

In certain embodiments, some or all of the functionality described herein as being performed by a WD may be provided by processing circuitry 1520 executing instructions stored on device readable medium 1530, which in certain embodiments may be a computer-readable storage medium. In alternative embodiments, some or all of the functionality may be provided by processing circuitry 1520 without executing instructions stored on a separate or discrete device readable storage medium, such as in a hard-wired manner. In any of those particular embodiments, whether executing instructions stored on a device readable storage medium or not, processing circuitry 1520 can be configured to perform the described functionality. The benefits provided by such functionality are not limited to processing circuitry 1520 alone or to other components of WD 1510 but are enjoyed by WD 1510 as a whole, and/or by end users and the wireless network generally.

Processing circuitry 1520 may be configured to perform any determining, calculating, or similar operations (e.g., certain obtaining operations) described herein as being performed by a WD. These operations, as performed by processing circuitry 1520, may include processing information obtained by processing circuitry 1520 by, for example, converting the obtained information into other information, comparing the obtained information or converted information to information stored by WD 1510, and/or performing one or more operations based on the obtained information or converted information, and as a result of said processing making a determination.

Device readable medium 1530 may be operable to store a computer program, software, an application including one or more of logic, rules, code, tables, etc. and/or other instructions capable of being executed by processing circuitry 1520. Device readable medium 1530 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1520. In some embodiments, processing circuitry 1520 and device readable medium 1530 may be considered to be integrated.

User interface equipment 1532 may provide components that allow for a human user to interact with WD 1510. Such interaction may be of many forms, such as visual, audial, tactile, etc. User interface equipment 1532 may be operable to produce output to the user and to allow the user to provide input to WD 1510. The type of interaction may vary depending on the type of user interface equipment 1532 installed in WD 1510. For example, if WD 1510 is a smart phone, the interaction may be via a touch screen; if WD 1510 is a smart meter, the interaction may be through a screen that provides usage (e.g., the number of gallons used) or a speaker that provides an audible alert (e.g., if smoke is detected). User interface equipment 1532 may include input interfaces, devices and circuits, and output interfaces, devices and circuits. User interface equipment 1532 is configured to allow input of information into WD 1510 and is connected to processing circuitry 1520 to allow processing circuitry 1520 to process the input information. User interface equipment 1532 may include, for example, a microphone, a proximity or other sensor, keys/buttons, a touch display, one or more cameras, a USB port, or other input circuitry. User interface equipment 1532 is also configured to allow output of information from WD 1510, and to allow processing circuitry 1520 to output information from WD 1510. User interface equipment 1532 may include, for example, a speaker, a display, vibrating circuitry, a USB port, a headphone interface, or other output circuitry. Using one or more input and output interfaces, devices, and circuits, of user interface equipment 1532, WD 1510 may communicate with end users and/or the wireless network, and allow them to benefit from the functionality described herein.

Auxiliary equipment 1534 is operable to provide more specific functionality which may not be generally performed by WDs. This may comprise specialized sensors for doing measurements for various purposes, interfaces for additional types of communication such as wired communications etc.

The inclusion and type of components of auxiliary equipment 1534 may vary depending on the embodiment and/or scenario.

Power source 1536 may, in some embodiments, be in the form of a battery or battery pack. Other types of power sources, such as an external power source (e.g., an electricity outlet), photovoltaic devices or power cells, may also be used. WD 1510 may further comprise power circuitry 1537 for delivering power from power source 1536 to the various parts of WD 1510 which need power from power source 1536 to carry out any functionality described or indicated herein. Power circuitry 1537 may in certain embodiments comprise power management circuitry. Power circuitry 1537 may additionally or alternatively be operable to receive power from an external power source; in which case WD 1510 may be connectable to the external power source (such as an electricity outlet) via input circuitry or an interface such as an electrical power cable. Power circuitry 1537 may also in certain embodiments be operable to deliver power from an external power source to power source 1536. This may be, for example, for the charging of power source 1536. Power circuitry 1537 may perform any formatting, converting, or other modification to the power from power source 1536 to make the power suitable for the respective components of WD 1510 to which power is supplied.

Figure 16:
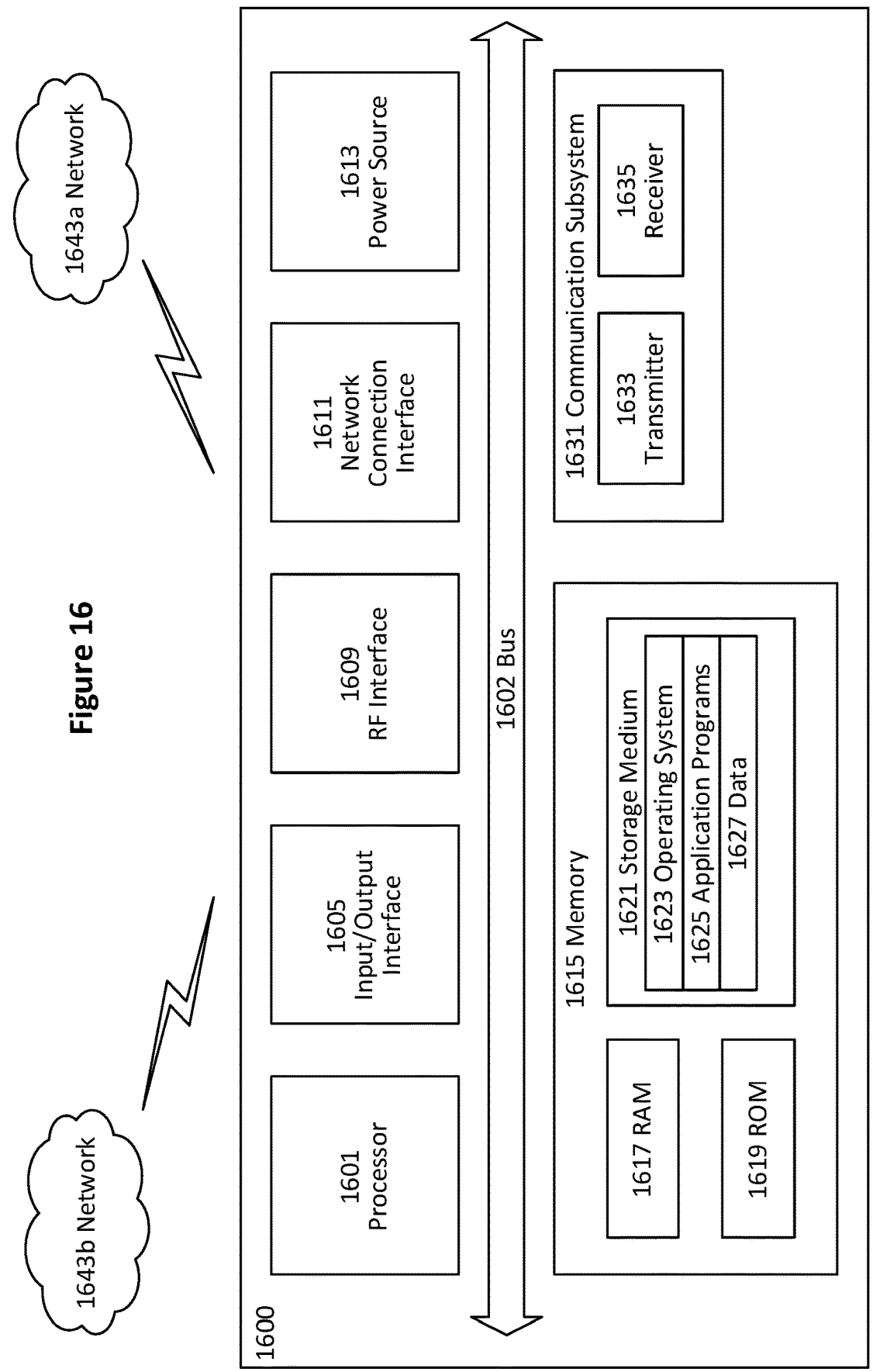
FIG. 16 is a block diagram of a user equipment in accordance with some embodiments.

FIG. 16 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 1600 may be any UE identified by the $3^{rd}$ Generation Partnership Project (3GPP), including a NB-IoT UE, a machine type communication (MTC) UE, and/or an enhanced MTC (eMTC) UE. UE 1600, as illustrated in FIG. 16, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 16 is a UE, the components discussed herein are equally applicable to a WD, and vice-versa.

In FIG. 16, UE 1600 includes processing circuitry 1601 that is operatively coupled to input/output interface 1605, radio frequency (RF) interface 1609, network connection interface 1611, memory 1615 including random access memory (RAM) 1617, read-only memory (ROM) 1619, and storage medium 1621 or the like, communication subsystem 1631, power source 1613, and/or any other component, or any combination thereof. Storage medium 1621 includes operating system 1623, application program 1625, and data 1627. In other embodiments, storage medium 1621 may include other similar types of information. Certain UEs may utilize all of the components shown in FIG. 16, or only a subset of the components. The level of integration between the components may vary from one UE to another UE. Further, certain UEs may contain multiple instances of a component, such as multiple processors, memories, transceivers, transmitters, receivers, etc.

In FIG. 16, processing circuitry 1601 may be configured to process computer instructions and data. Processing circuitry 1601 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1601 may include two central processing units (CPUs). Data may be information in a form suitable for use by a computer.

In the depicted embodiment, input/output interface 1605 may be configured to provide a communication interface to an input device, output device, or input and output device. UE 1600 may be configured to use an output device via input/output interface 1605. An output device may use the same type of interface port as an input device. For example, a USB port may be used to provide input to and output from UE 1600. The output device may be a speaker, a sound card, a video card, a display, a monitor, a printer, an actuator, an emitter, a smartcard, another output device, or any combination thereof. UE 1600 may be configured to use an input device via input/output interface 1605 to allow a user to capture information into UE 1600. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 16, RF interface 1609 may be configured to provide a communication interface to RF components such as a transmitter, a receiver, and an antenna. Network connection interface 1611 may be configured to provide a communication interface to network 1643a. Network 1643a may encompass wired and/or wireless networks such as a local-area network (LAN), a wide-area network (WAN), a computer network, a wireless network, a telecommunications network, another like network or any combination thereof. For example, network 1643a may comprise a Wi-Fi network. Network connection interface 1611 may be configured to include a receiver and a transmitter interface used to communicate with one or more other devices over a communication network according to one or more communication protocols, such as Ethernet, TCP/IP, SONET, ATM, or the like. Network connection interface 1611 may implement receiver and transmitter functionality appropriate to the communication network links (e.g., optical, electrical, and the like). The transmitter and receiver functions may share circuit components, software or firmware, or alternatively may be implemented separately.

RAM 1617 may be configured to interface via bus 1602 to processing circuitry 1601 to provide storage or caching of data or computer instructions during the execution of software programs such as the operating system, application programs, and device drivers. ROM 1619 may be configured to provide computer instructions or data to processing circuitry 1601. For example, ROM 1619 may be configured to store invariant low-level system code or data for basic system functions such as basic input and output (I/O), startup, or reception of keystrokes from a keyboard that are stored in a non-volatile memory. Storage medium 1621 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1621 may be configured to include operating system 1623, application program 1625 such as a web browser application, a widget or gadget engine or another application, and data file 1627. Storage medium 1621 may store, for use by UE 1600, any of a variety of various operating systems or combinations of operating systems.

Storage medium 1621 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1621 may allow UE 1600 to access computer-executable instructions, application programs or the like, stored on transitory or non-transitory memory media, to off-load data, or to upload data. An article of manufacture, such as one utilizing a communication system may be tangibly embodied in storage medium 1621, which may comprise a device readable medium.

In FIG. 16, processing circuitry 1601 may be configured to communicate with network 1643*b* using communication subsystem 1631. Network 1643*a* and network 1643*b* may be the same network or networks or different network or networks. Communication subsystem 1631 may be configured to include one or more transceivers used to communicate with network 1643*b*. For example, communication subsystem 1631 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 1633 and/or receiver 1635 to implement transmitter or receiver functionality, respectively, appropriate to the RAN links (e.g., frequency allocations and the like). Further, transmitter 1633 and receiver 1635 of each transceiver may share circuit components, software or firmware, or alternatively may be implemented separately.

In the illustrated embodiment, the communication functions of communication subsystem 1631 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1631 may include cellular communication, Wi-Fi communication, Bluetooth communication, and GPS communication. Network 1643*b* may encompass wired and/or wireless networks such as a local-area network (LAN), a wide-area network (WAN), a computer network, a wireless network, a telecommunications network, another like network or any combination thereof. For example, network 1643*b* may be a cellular network, a Wi-Fi network, and/or a near-field network. Power source 1613 may be configured to provide alternating current (AC) or direct current (DC) power to components of UE 1600.

The features, benefits and/or functions described herein may be implemented in one of the components of UE 1600 or partitioned across multiple components of UE 1600. Further, the features, benefits, and/or functions described herein may be implemented in any combination of hardware, software or firmware. In one example, communication subsystem 1631 may be configured to include any of the components described herein. Further, processing circuitry 1601 may be configured to communicate with any of such components over bus 1602. In another example, any of such components may be represented by program instructions stored in memory that when executed by processing circuitry 1601 perform the corresponding functions described herein. In another example, the functionality of any of such components may be partitioned between processing circuitry 1601 and communication subsystem 1631. In another example, the non-computationally intensive functions of any of such components may be implemented in software or firmware and the computationally intensive functions may be implemented in hardware.

Figure 17:
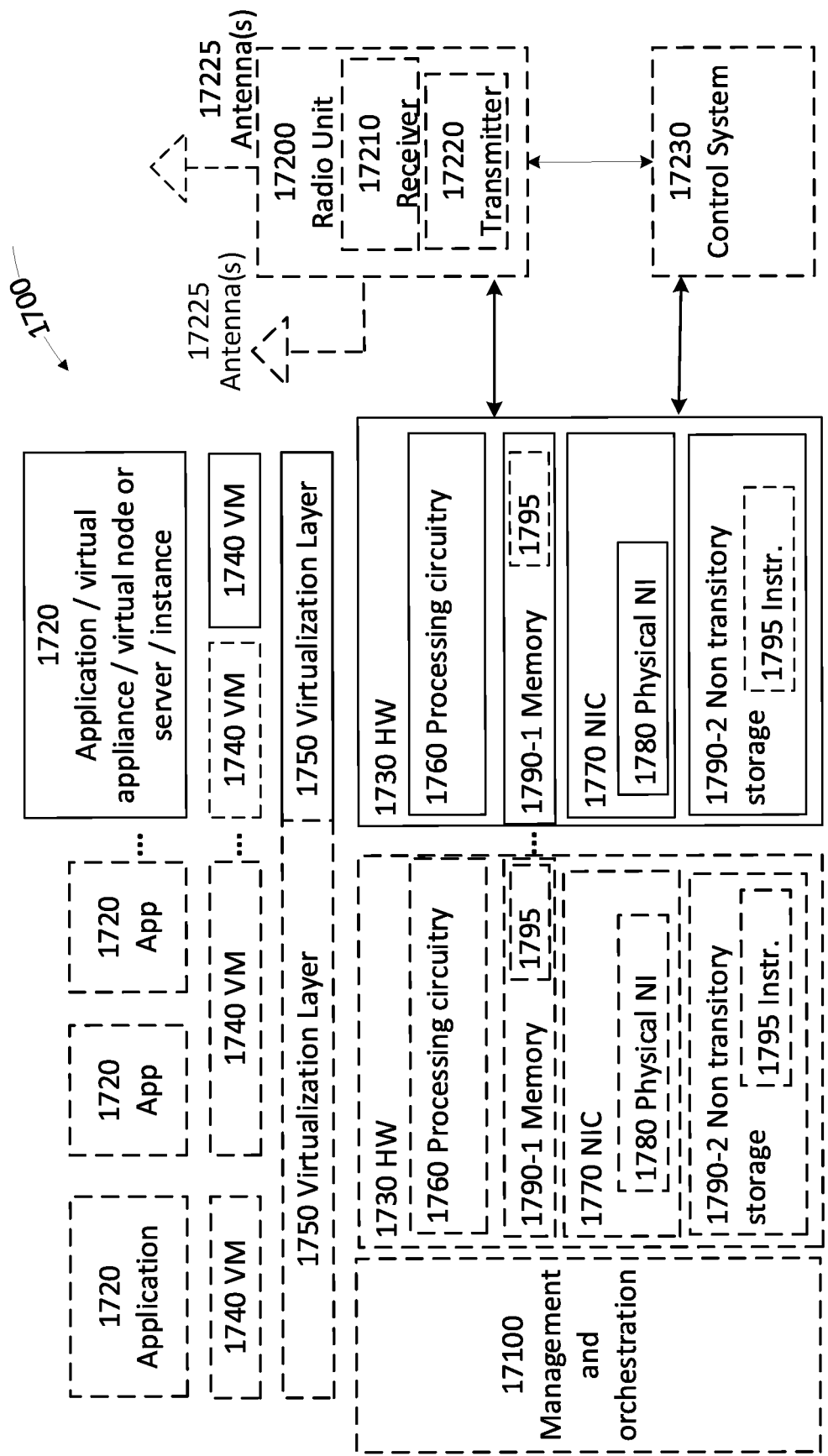
FIG. 17 is a block diagram of a virtualization environment in accordance with some embodiments.

FIG. 17 is a schematic block diagram illustrating a virtualization environment 1700 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1700 hosted by one or more of hardware nodes 1730. Further, in embodiments in which the virtual node is not a radio access node or does not require radio connectivity (e.g., a core network node), then the network node may be entirely virtualized.

The functions may be implemented by one or more applications 1720 (which may alternatively be called software instances, virtual appliances, network functions, virtual nodes, virtual network functions, etc.) operative to implement some of the features, functions, and/or benefits of some of the embodiments disclosed herein. Applications 1720 are run in virtualization environment 1700 which provides hardware 1730 comprising processing circuitry 1760 and memory 1790. Memory 1790 contains instructions 1795 executable by processing circuitry 1760 whereby application 1720 is operative to provide one or more of the features, benefits, and/or functions disclosed herein.

Virtualization environment 1700, comprises general-purpose or special-purpose network hardware devices 1730 comprising a set of one or more processors or processing circuitry 1760, which may be commercial off-the-shelf (COTS) processors, dedicated Application Specific Integrated Circuits (ASICs), or any other type of processing circuitry including digital or analog hardware components or special purpose processors. Each hardware device may comprise memory 1790-1 which may be non-persistent memory for temporarily storing instructions 1795 or software executed by processing circuitry 1760. Each hardware device may comprise one or more network interface controllers (NICs) 1770, also known as network interface cards, which include physical network interface 1780. Each hardware device may also include non-transitory, persistent, machine-readable storage media 1790-2 having stored therein software 1795 and/or instructions executable by processing circuitry 1760. Software 1795 may include any type of software including software for instantiating one or more virtualization layers 1750 (also referred to as hypervisors), software to execute virtual machines 1740 as well as software allowing it to execute functions, features and/or benefits described in relation with some embodiments described herein.

Virtual machines 1740, comprise virtual processing, virtual memory, virtual networking or interface and virtual storage, and may be run by a corresponding virtualization layer 1750 or hypervisor. Different embodiments of the instance of virtual appliance 1720 may be implemented on one or more of virtual machines 1740, and the implementations may be made in different ways.

During operation, processing circuitry 1760 executes software 1795 to instantiate the hypervisor or virtualization layer 1750, which may sometimes be referred to as a virtual machine monitor (VMM). Virtualization layer 1750 may present a virtual operating platform that appears like networking hardware to virtual machine 1740.

As shown in FIG. 17, hardware 1730 may be a standalone network node with generic or specific components. Hardware 1730 may comprise antenna 17225 and may implement some functions via virtualization. Alternatively, hardware 1730 may be part of a larger cluster of hardware (e.g. such as in a data center or customer premise equipment (CPE)) where many hardware nodes work together and are managed via management and orchestration (MANO) 17100, which, among others, oversees lifecycle management of applications 1720.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1740 may be a software implementation of a physical machine that runs programs as if they were executing on a physical, non-virtualized machine. Each of virtual machines 1740, and that part of hardware 1730 that executes that virtual machine, be it hardware dedicated to that virtual machine and/or hardware shared by that virtual machine with others of the virtual machines 1740, forms a separate virtual network elements (VNE).

Still in the context of NFV, Virtual Network Function (VNF) is responsible for handling specific network functions that run in one or more virtual machines 1740 on top of hardware networking infrastructure 1730 and corresponds to application 1720 in FIG. 17.

In some embodiments, one or more radio units 17200 that each include one or more transmitters 17220 and one or more receivers 17210 may be coupled to one or more antennas 17225. Radio units 17200 may communicate directly with hardware nodes 1730 via one or more appropriate network interfaces and may be used in combination with the virtual components to provide a virtual node with radio capabilities, such as a radio access node or a base station.

In some embodiments, some signalling can be affected with the use of control system 17230 which may alternatively be used for communication between the hardware nodes 1730 and radio units 17200.

Figure 18:
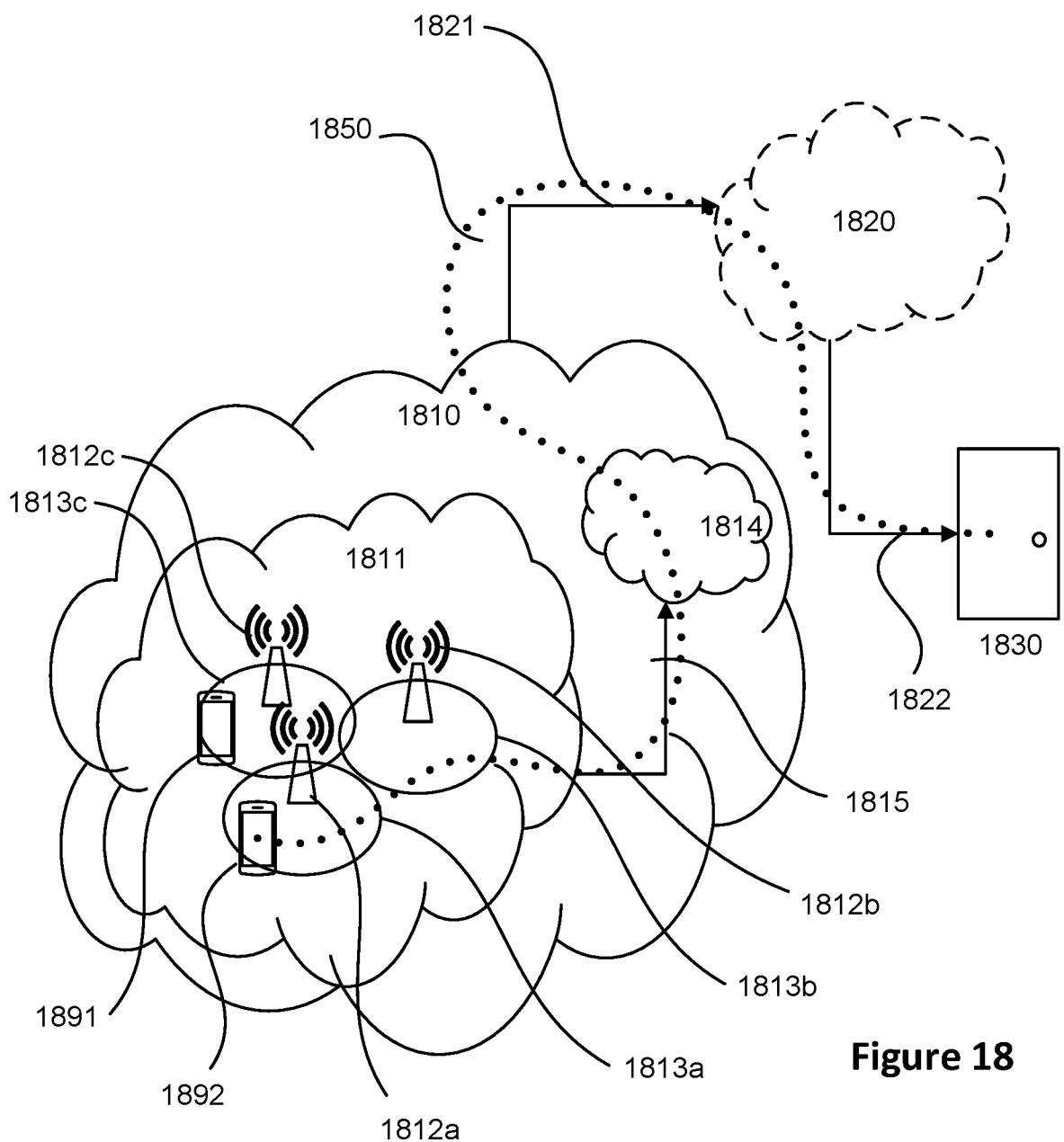
FIG. 18 is a block diagram of a telecommunication network connected via an intermediate network to a host computer in accordance with some embodiments.

FIG. 18 illustrates a telecommunication network connected via an intermediate network to a host computer in accordance with some embodiments. In particular, with reference to FIG. 18, in accordance with an embodiment, a communication system includes telecommunication network 1810, such as a 3GPP-type cellular network, which comprises access network 1811, such as a radio access network, and core network 1814. Access network 1811 comprises a plurality of base stations 1812a, 1812b, 1812c, such as NBs, eNBs, gNBs or other types of wireless access points, each defining a corresponding coverage area 1813a, 1813b, 1813c. Each base station 1812a, 1812b, 1812c is connectable to core network 1814 over a wired or wireless connection 1815. A first UE 1891 located in coverage area 1813c is configured to wirelessly connect to, or be paged by, the corresponding base station 1812c. A second UE 1892 in coverage area 1813a is wirelessly connectable to the corresponding base station 1812a. While a plurality of UEs 1891, 1892 are illustrated in this example, the disclosed embodiments are equally applicable to a situation where a sole UE is in the coverage area or where a sole UE is connecting to the corresponding base station 1812.

Telecommunication network 1810 is itself connected to host computer 1830, which may be embodied in the hardware and/or software of a standalone server, a cloud-implemented server, a distributed server or as processing resources in a server farm. Host computer 1830 may be under the ownership or control of a service provider, or may be operated by the service provider or on behalf of the service provider. Connections 1821 and 1822 between telecommunication network 1810 and host computer 1830 may extend directly from core network 1814 to host computer 1830 or may go via an optional intermediate network 1820. Intermediate network 1820 may be one of, or a combination of more than one of, a public, private or hosted network; intermediate network 1820, if any, may be a backbone network or the Internet; in particular, intermediate network 1820 may comprise two or more sub-networks (not shown).

The communication system of FIG. 18 as a whole enables connectivity between the connected UEs 1891, 1892 and host computer 1830. The connectivity may be described as an over-the-top (OTT) connection 1850. Host computer 1830 and the connected UEs 1891, 1892 are configured to communicate data and/or signaling via OTT connection 1850, using access network 1811, core network 1814, any intermediate network 1820 and possible further infrastructure (not shown) as intermediaries. OTT connection 1850 may be transparent in the sense that the participating communication devices through which OTT connection 1850 passes are unaware of routing of uplink and downlink communications. For example, base station 1812 may not or need not be informed about the past routing of an incoming downlink communication with data originating from host computer 1830 to be forwarded (e.g., handed over) to a connected UE 1891. Similarly, base station 1812 need not be aware of the future routing of an outgoing uplink communication originating from the UE 1891 towards the host computer 1830.

Figure 19:
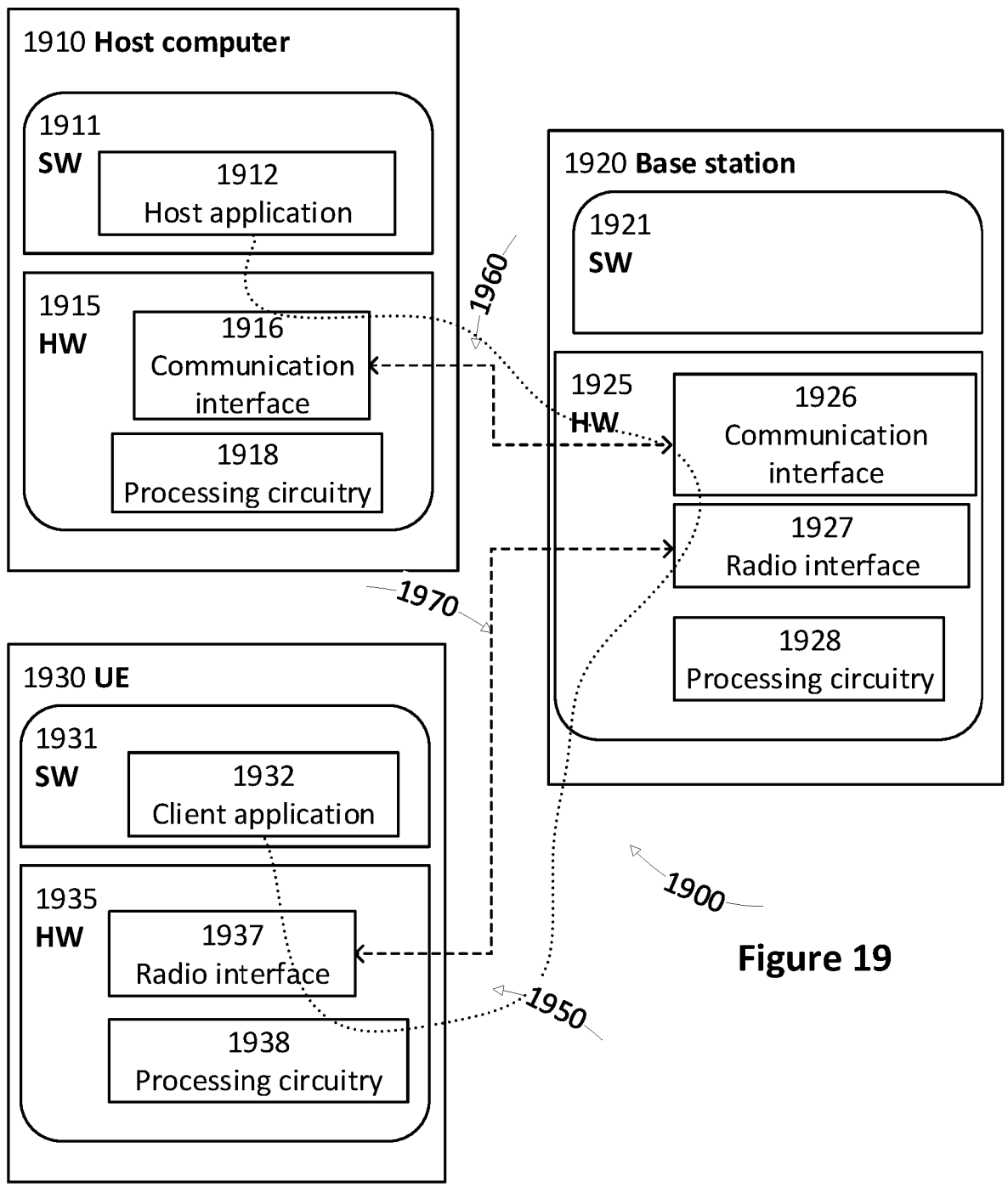
FIG. 19 is a block diagram of a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 19. FIG. 19 illustrates host computer communicating via a base station with a user equipment over a partially wireless connection in accordance with some embodiments In communication system 1900, host computer 1910 comprises hardware 1915 including communication interface 1916 configured to set up and maintain a wired or wireless connection with an interface of a different communication device of communication system 1900. Host computer 1910 further comprises processing circuitry 1918, which may have storage and/or processing capabilities. In particular, processing circuitry 1918 may comprise one or more programmable processors, application-specific integrated circuits, field programmable gate arrays or combinations of these (not shown) adapted to execute instructions. Host computer 1910 further comprises software 1911, which is stored in or accessible by host computer 1910 and executable by processing circuitry 1918. Software 1911 includes host application 1912. Host application 1912 may be operable to provide a service to a remote user, such as UE 1930 connecting via OTT connection 1950 terminating at UE 1930 and host computer 1910. In providing the service to the remote user, host application 1912 may provide user data which is transmitted using OTT connection 1950.

Communication system 1900 further includes base station 1920 provided in a telecommunication system and comprising hardware 1925 enabling it to communicate with host computer 1910 and with UE 1930. Hardware 1925 may include communication interface 1926 for setting up and maintaining a wired or wireless connection with an interface of a different communication device of communication system 1900, as well as radio interface 1927 for setting up and maintaining at least wireless connection 1970 with UE 1930 located in a coverage area (not shown in FIG. 19) served by base station 1920. Communication interface 1926 may be configured to facilitate connection 1960 to host computer 1910. Connection 1960 may be direct or it may pass through a core network (not shown in FIG. 19) of the telecommunication system and/or through one or more intermediate networks outside the telecommunication system. In the embodiment shown, hardware 1925 of base station 1920 further includes processing circuitry 1928, which may comprise one or more programmable processors, application-specific integrated circuits, field programmable gate arrays or combinations of these (not shown) adapted to execute instructions. Base station 1920 further has software 1921 stored internally or accessible via an external connection.

Communication system 1900 further includes UE 1930 already referred to. Its hardware 1935 may include radio interface 1937 configured to set up and maintain wireless connection 1970 with a base station serving a coverage area in which UE 1930 is currently located. Hardware 1935 of UE 1930 further includes processing circuitry 1938, which may comprise one or more programmable processors, application-specific integrated circuits, field programmable gate arrays or combinations of these (not shown) adapted to execute instructions. UE 1930 further comprises software 1931, which is stored in or accessible by UE 1930 and executable by processing circuitry 1938. Software 1931 includes client application 1932. Client application 1932 may be operable to provide a service to a human or non-human user via UE 1930, with the support of host computer 1910. In host computer 1910, an executing host application 1912 may communicate with the executing client application 1932 via OTT connection 1950 terminating at UE 1930 and host computer 1910. In providing the service to the user, client application 1932 may receive request data from host application 1912 and provide user data in response to the request data. OTT connection 1950 may transfer both the request data and the user data. Client application 1932 may interact with the user to generate the user data that it provides.

It is noted that host computer 1910, base station 1920 and UE 1930 illustrated in FIG. 19 may be similar or identical to host computer 1830, one of base stations 1812a, 1812b, 1812c and one of UEs 1891, 1892 of FIG. 18, respectively. This is to say, the inner workings of these entities may be as shown in FIG. 19 and independently, the surrounding network topology may be that of FIG. 18.

In FIG. 19, OTT connection 1950 has been drawn abstractly to illustrate the communication between host computer 1910 and UE 1930 via base station 1920, without explicit reference to any intermediary devices and the precise routing of messages via these devices. Network infrastructure may determine the routing, which it may be configured to hide from UE 1930 or from the service provider operating host computer 1910, or both. While OTT connection 1950 is active, the network infrastructure may further take decisions by which it dynamically changes the routing (e.g., on the basis of load balancing consideration or reconfiguration of the network).

Wireless connection 1970 between UE 1930 and base station 1920 is in accordance with the teachings of the embodiments described throughout this disclosure. One or more of the various embodiments improve the performance of OTT services provided to UE 1930 using OTT connection 1950, in which wireless connection 1970 forms the last segment.

A measurement procedure may be provided for the purpose of monitoring data rate, latency and other factors on which the one or more embodiments improve. There may further be an optional network functionality for reconfiguring OTT connection 1950 between host computer 1910 and UE 1930, in response to variations in the measurement results. The measurement procedure and/or the network functionality for reconfiguring OTT connection 1950 may be implemented in software 1911 and hardware 1915 of host computer 1910 or in software 1931 and hardware 1935 of UE 1930, or both. In embodiments, sensors (not shown) may be deployed in or in association with communication devices through which OTT connection 1950 passes; the sensors may participate in the measurement procedure by supplying values of the monitored quantities exemplified above, or supplying values of other physical quantities from which software 1911, 1931 may compute or estimate the monitored quantities. The reconfiguring of OTT connection 1950 may include message format, retransmission settings, preferred routing etc.; the reconfiguring need not affect base station 1920, and it may be unknown or imperceptible to base station 1920. Such procedures and functionalities may be known and practiced in the art. In certain embodiments, measurements may involve proprietary UE signaling facilitating host computer 1910's measurements of throughput, propagation times, latency and the like. The measurements may be implemented in that software 1911 and 1931 causes messages to be transmitted, in particular empty or 'dummy' messages, using OTT connection 1950 while it monitors propagation times, errors etc.

Figure 20:
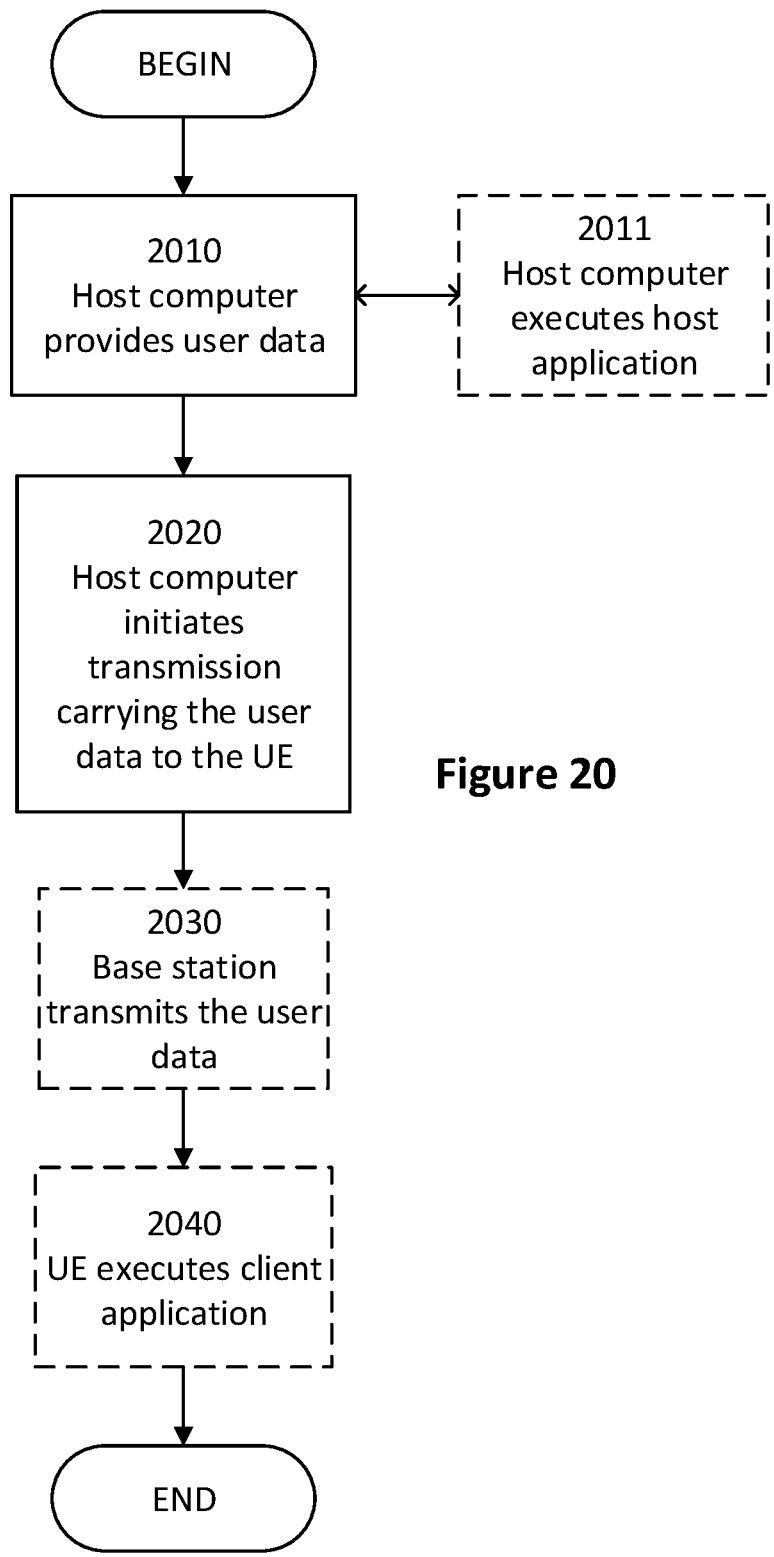
FIG. 20 is a block diagram of methods implemented in a communication system including a host computer, a base station and a user equipment in accordance with some embodiments.

FIG. 20 is a flowchart illustrating a method implemented in a communication system, in accordance with one embodiment. The communication system includes a host computer, a base station and a UE which may be those described with reference to FIGS. 18 and 19. For simplicity of the present disclosure, only drawing references to FIG. 20 will be included in this section. In step 2010, the host computer provides user data. In substep 2011 (which may be optional) of step 2010, the host computer provides the user data by executing a host application. In step 2020, the host computer initiates a transmission carrying the user data to the UE. In step 2030 (which may be optional), the base station transmits to the UE the user data which was carried in the transmission that the host computer initiated, in accordance with the teachings of the embodiments described throughout this disclosure. In step 2040 (which may also be optional), the UE executes a client application associated with the host application executed by the host computer.

Figure 21:
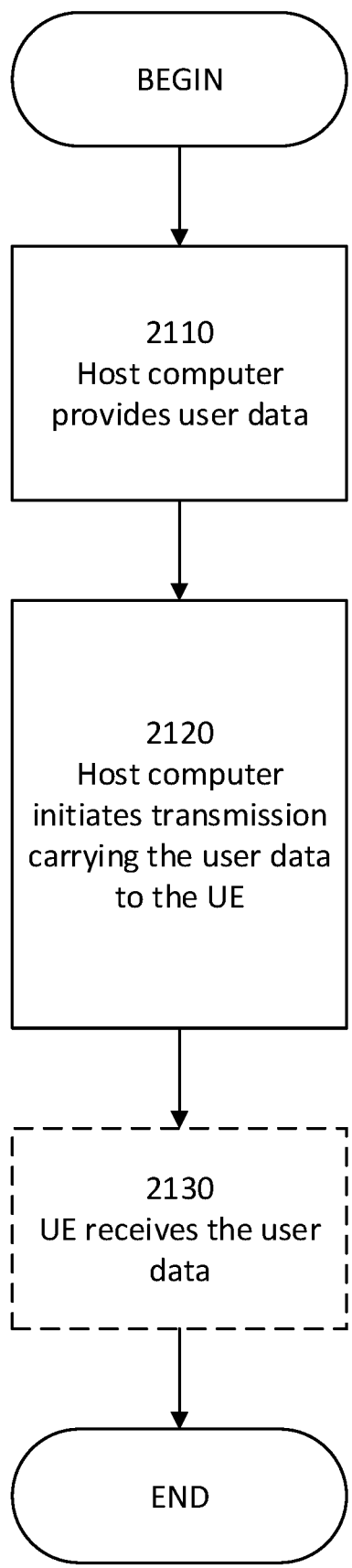
FIG. 21 is a block diagram of methods implemented in a communication system including a host computer, a base station and a user equipment in accordance with some embodiments.

FIG. 21 is a flowchart illustrating a method implemented in a communication system, in accordance with one embodiment. The communication system includes a host computer, a base station and a UE which may be those described with reference to FIGS. 18 and 19. For simplicity of the present disclosure, only drawing references to FIG. 21 will be included in this section. In step 2110 of the method, the host computer provides user data. In an optional substep (not shown) the host computer provides the user data by executing a host application. In step 2120, the host computer initiates a transmission carrying the user data to the UE. The transmission may pass via the base station, in accordance with the teachings of the embodiments described throughout this disclosure. In step 2130 (which may be optional), the UE receives the user data carried in the transmission.

Figure 22:
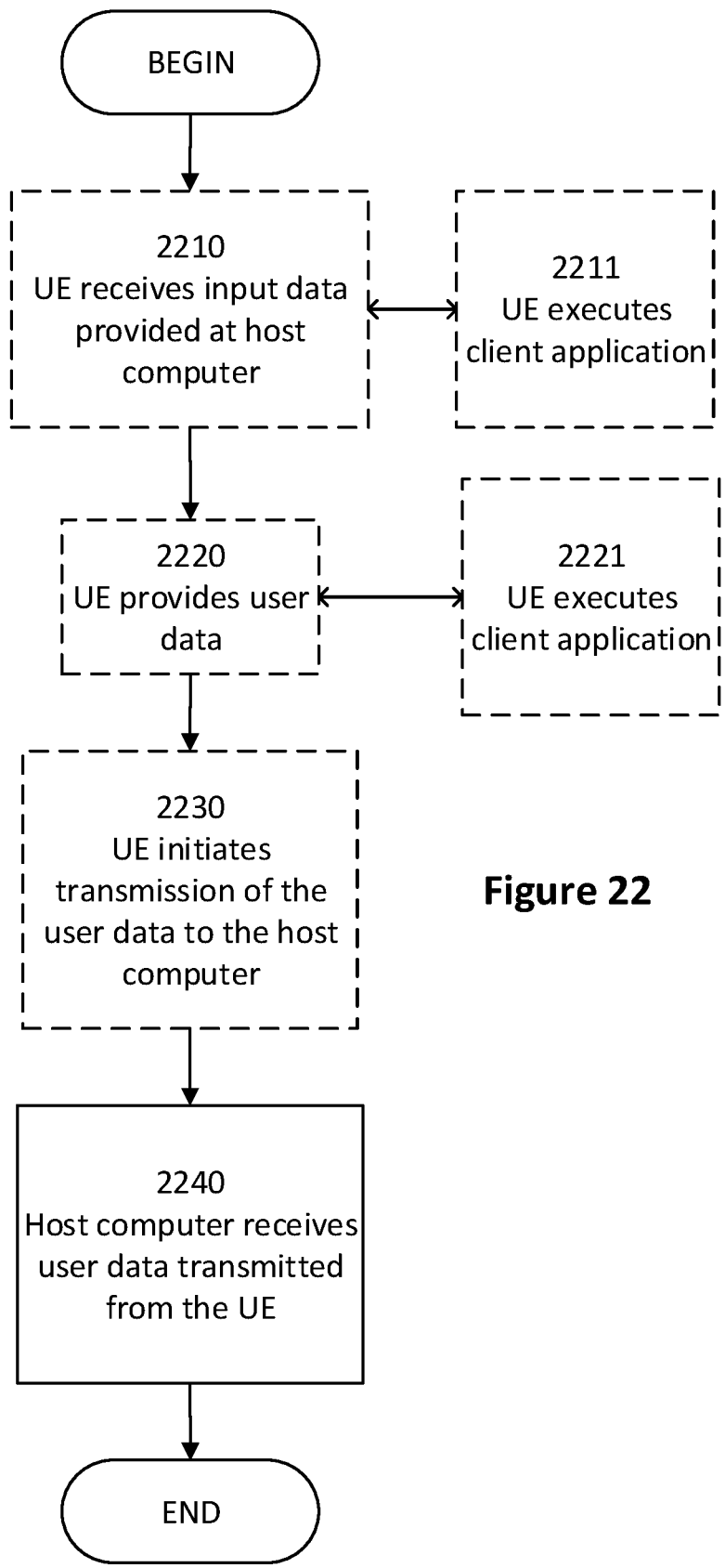
FIG. 22 is a block diagram of methods implemented in a communication system including a host computer, a base station and a user equipment in accordance with some embodiments.

FIG. 22 is a flowchart illustrating a method implemented in a communication system, in accordance with one embodiment. The communication system includes a host computer, a base station and a UE which may be those described with reference to FIGS. 18 and 19. For simplicity of the present disclosure, only drawing references to FIG. 22 will be included in this section. In step 2210 (which may be optional), the UE receives input data provided by the host computer. Additionally or alternatively, in step 2220, the UE provides user data. In substep 2221 (which may be optional) of step 2220, the UE provides the user data by executing a client application. In substep 2211 (which may be optional) of step 2210, the UE executes a client application which provides the user data in reaction to the received input data provided by the host computer. In providing the user data, the executed client application may further consider user input received from the user. Regardless of the specific manner in which the user data was provided, the UE initiates, in substep 2230 (which may be optional), transmission of the user data to the host computer. In step 2240 of the method, the host computer receives the user data transmitted from the UE, in accordance with the teachings of the embodiments described throughout this disclosure.

Figure 23:
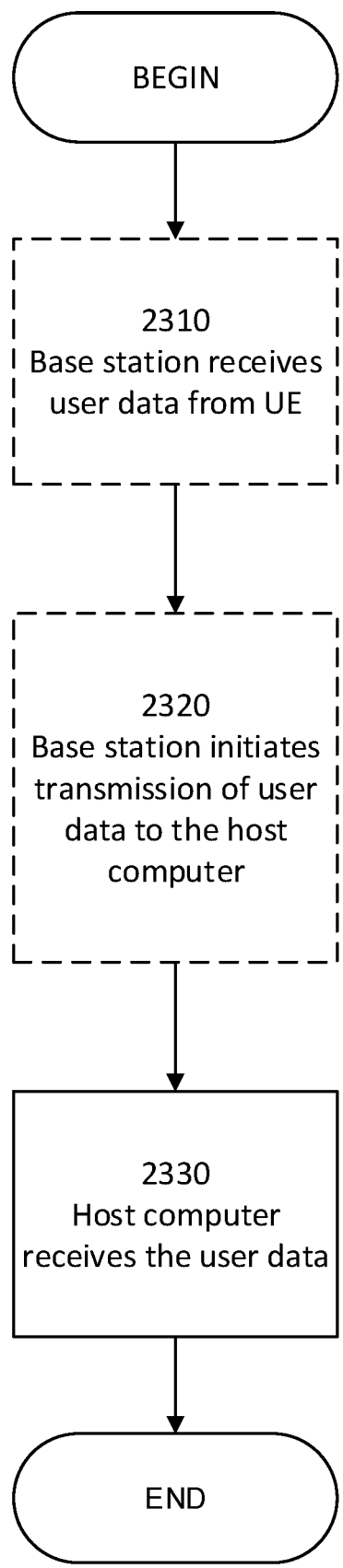
FIG. 23 is a block diagram of methods implemented in a communication system including a host computer, a base station and a user equipment in accordance with some embodiments.

FIG. 23 is a flowchart illustrating a method implemented in a communication system, in accordance with one embodiment. The communication system includes a host computer, a base station and a UE which may be those described with reference to FIGS. 18 and 19. For simplicity of the present disclosure, only drawing references to FIG. 23 will be included in this section. In step 2310 (which may be optional), in accordance with the teachings of the embodiments described throughout this disclosure, the base station receives user data from the UE. In step 2320 (which may be optional), the base station initiates transmission of the received user data to the host computer. In step 2330 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

Additional information may also be found in the document(s) provided in the Appendix.

EMBODIMENTS

1. A method implemented by a Policy Control Function (PCF) of a Core Network (CN) node in a communications network, the method comprising:
    receiving a request message from an Access and Mobility management Function (AMF) of the CN node or a different CN node, the request message comprising a requested Data Network Name (DNN) designated by a wireless terminal in a Protocol Data Unit (PDU) session establishment request to the AMF;

responsive to the request message and to session-specific information, determining a selected DNN and a Session Management Function (SMF) index, said SMF index corresponding to one or more SMFs of the CN node or one or more other CN nodes, each of said one or more SMFs being registered with a Network Repository Function (NRF) of the CN node or the different CN node according to a corresponding SMF profile; and sending the selected DNN and the SMF index to the AMF to facilitate selection of one of the one or more SMFs via the NRF for establishment of the PDU session between the wireless terminal and the selected SMF.

2. The method of embodiment 1 wherein said selecting the DNN comprises manipulating the requested DNN to generate the selected DNN or replacing the requested DNN with a selected DNN.

3. The method of any one of embodiments 1-2 wherein the SMF index comprises an SMF Selection index.

4. The method of any one of embodiments 1-3 wherein the session-specific information comprises:
one or more device-specific characteristics of the wireless terminal requesting the PDU session; and/or
one or more subscriber-specific characteristics of a subscriber requesting the PDU session; and/or
one or more capabilities of the one or more SMFs corresponding to the SMF index; and/or
one or more heuristic analysis capabilities.

5. The method of embodiment 4 wherein the one or more device-specific characteristics of the wireless terminal comprises one or more capabilities of the wireless terminal and/or a terminal identifier and/or a location of the wireless terminal in the communications network.

6. The method of embodiment 4 wherein the one or more subscriber-specific characteristics comprises a subscriber subscription and/or a subscriber identifier.

7. The method of any one of embodiments 1-6 wherein the session-specific information is stored in at least the PCF.

8. The method of any one of embodiments 1-7 wherein each SMF profile defines one or more supported sets of SMF indexes.

9. The method of embodiment 8 wherein the one or more supported sets of SMF indexes are configured on a DNN level, and/or on a Single Network Slice Selection Assistance Information (S-NSSAI) level, and/or on an SMF level.

10. A Policy Control Function (PCF) of a Core Network (CN) node in a communications network, the PCF comprising one or more processing circuits configured to perform any of the steps of embodiments 1-9.

11. A method implemented by an Access and Mobility management Function (AMF) of a Core Network (CN) node in a communications network, the method comprising:
receiving a Protocol Data Unit (PDU) session establishment request from a wireless terminal in the communications network, the PDU session establishment request including a requested Data Network Name (DNN);
sending a request message to a Policy Control Function (PCF) of the CN node or a different CN node, the message comprising the requested DNN;

in response to the request message, receiving a response message from the PCF, the response message including a selected DNN and a Session Management Function (SMF) index, each selected by the PCF responsive to the requested DNN and session-specific information, said SMF index corresponding to one or more SMFs of the CN node or one or more other CN nodes, each of said one or more SMFs being registered with a Network Repository Function (NRF) of the CN node according to a corresponding SMF profile; and responsive to the reception of the response message, establishing a PDU session between the wireless terminal and one of the one or more SMFs associated with the SMF index.

12. The method of embodiment 11 wherein said establishing the PDU session comprises:
sending the selected DNN and the SMF index from the AMF to the NRF of the CN node or the different node;
receiving, from the NRF, a list of SMFs including one or more SMFs corresponding to the SMF index;
selecting one of the one or more SMFs in the list of SMFs for the PDU session; and
establishing the PDU session between the wireless terminal and the selected SMF.

13. The method of any one of embodiments 11-12 wherein the SMF index comprises an SMF Selection index.

14. The method of any one of embodiments 11-13 wherein the session-specific information comprises:
one or more device-specific characteristics of the wireless terminal requesting the PDU session; and/or
one or more subscriber-specific characteristics of a subscriber requesting the PDU session; and/or
one or more capabilities of the one or more SMFs corresponding to the SMF index; and/or
one or more heuristic analysis capabilities.

15. The method of embodiment 14 wherein the one or more device-specific characteristics of the wireless terminal comprises one or more capabilities of the wireless terminal and/or a terminal identifier and/or a location of the wireless terminal in the communications network.

16. The method of embodiment 14 wherein the one or more subscriber-specific characteristics comprises a subscriber subscription and/or a subscriber identifier.

17. The method of any one of embodiments 11-16 wherein each SMF profile defines one or more supported sets of SMF indexes.

18. The method of embodiment 17 wherein the one or more supported sets of SMF indexes are configured on a DNN level, and/or on a Single Network Slice Selection Assistance Information (S-NSSAI) level, and/or on an SMF level.

19. An Access and Mobility management Function (AMF) of a Core Network (CN) node in a communications network, the AMF comprising one or more processing circuits configured to perform any of the steps of embodiments 11-18.

20. A method implemented by a Core Network (CN) node of a communications network comprising a wireless terminal in communication with the CN node, the method comprising:
receiving a Protocol Data Unit (PDU) session establishment request from the wireless terminal, the PDU session establishment request including a requested Data Network Name (DNN);

responsive to the requested DNN and to session-specific information, determining a selected DNN and a Session Management Function (SMF) index, said SMF index corresponding to one or more SMFs of the CN node or one or more other CN nodes, each of said one or more SMFs being registered with a Network Repository Function (NRF) of the CN node or a different CN node according to a corresponding SMF profile; and establishing a PDU session between the wireless terminal and one of the one or more SMFs corresponding to the SMF index and responsive to the selected DNN and the SMF index.

21. The method of embodiment 20 where said determining the selected DNN and the SMF index comprises:

receiving, at a Policy Control Function (PCF) of the CN node or the different CN node, a request message from an Access and Mobility management Function (AMF) of the CN node or the different CN node, the request message comprising the requested Data Network Name (DNN);

determining, by the PCF and responsive to the received message and to session-specific information, the selected DNN and the SMF index; and sending a response message including the selected DNN and the SMF index from the PCF to the AMF.

22. The method of embodiment 21 wherein said establishing the PDU session comprises, responsive to the AMF receiving the response message, the AMF establishing the PDU session between the wireless terminal and one of the one or more SMFs associated with the SMF index.

23. The method of embodiment 22 wherein said establishing the PDU session further comprises:

sending the selected DNN and the SMF index from the AMF to the NRF of the CN node or the different CN node;

receiving, from the NRF, a list of SMFs including one or more SMFs corresponding to the SMF index;

selecting, by the AMF, one of the one or more SMFs in the list of SMFs; and establishing the PDU session between the wireless terminal and the selected SMF.

24. The method of any one of embodiments 20-23 further comprising:

providing the SMF index from the AMF to the SMF; and selecting, by the SMF, a dedicated User Plane Function (UPF) for pre-paid subscribers responsive to the SMF index.

25. The method of any one of embodiments 20-24 wherein said selecting the DNN comprises manipulating the requested DNN to generate the selected DNN or replacing the requested DNN with a selected DNN.

26. The method of any one of embodiments 20-25 wherein the SMF index comprises an SMF Selection index.

27. The method of any one of embodiments 20-26 wherein the session-specific information comprises:

one or more device-specific characteristics of the wireless terminal requesting the PDU session; and/or one or more subscriber-specific characteristics of a subscriber requesting the PDU session; and/or one or more capabilities of the one or more SMFs corresponding to the SMF index; and/or one or more heuristic analysis capabilities.

28. The method of embodiment 27 wherein the one or more device-specific characteristics of the wireless terminal comprises one or more capabilities of the wireless terminal and/or a terminal identifier and/or a location of the wireless terminal in the communications network.

29. The method of embodiment 27 wherein the one or more subscriber-specific characteristics comprises a subscriber subscription and/or a subscriber identifier.

30. The method of any one of embodiments 20-29 wherein each SMF profile defines one or more supported sets of SMF indexes.

31. The method of embodiment 30 wherein the one or more supported sets of SMF indexes are configured on a DNN level, and/or on a Single Network Slice Selection Assistance Information (S-NSSAI) level, and/or on an SMF level.

32. A Core Network (CN) node (100) in a communications network (10), the CN node comprising one or more processing circuits (112, 122, 132, 142) configured to perform any of the steps of embodiments 20-31.

33. A computer program product for controlling a Policy Control Function (PCF) (120) of a Core Network (CN) node (100) in a communications network (10), the computer program product comprising software instructions which, when run on at least one processing circuit in the PCF, causes the PCF to execute the method according to any one of embodiments 1-9.

34. A computer-readable medium comprising the computer program product of embodiment 33.

35. The computer-readable medium of embodiment 34, wherein the computer-readable medium comprises a non-transitory computer-readable medium.

36. A computer program product for controlling an Access and Mobility management Function (AMF) (110) of a Core Network (CN) node (100) in a communications network (10), the computer program product comprising software instructions which, when run on at least one processing circuit (112) in the AMF (110), causes the AMF (110) to execute the method according to any one of embodiments 11-18.

37. A computer-readable medium comprising the computer program product of embodiment 36.

38. The computer-readable medium of embodiment 37, wherein the computer-readable medium comprises a non-transitory computer-readable medium.

39. A computer program product for controlling a Core Network (CN) node (100) in a communications network (10), the computer program product comprising software instructions which, when run on at least one processing circuit (112, 122, 132, 142) in the CN node (100), causes the CN node (100) to execute the method according to any one of embodiments 20-31.

40. A computer-readable medium comprising the computer program product of claim 39.

41. The computer-readable medium of embodiment 40, wherein the computer-readable medium comprises a non-transitory computer-readable medium.

42. A method (500) implemented by a Network Repository Function (NRF) (140) of a Core Network (CN) node (100) in a communications network (10), the method comprising;

receiving (510) a registration request from each of one or more Session Management Functions (SMFs) (130) in the CN node (100), the registration request including a corresponding SMF profile defining one or more sets of SMF indexes supported by the corresponding SMF; and registering (520) each SMF (130) with the NRF (140) according to the corresponding SMF profile.

43. The method of claim 42 wherein the one or more supported sets of SMF indexes are configured on a DNN level, and/or on a Single Network Slice Selection Assistance Information (S-NSSAI) level, and/or on an SMF level.

44. The method of any one of claims 42-43 further comprising:

receiving a selected DNN and an SMF index, each determined by a Policy Control Function (PCF) (120) of the CN node (100) or a different CN node, from an Access and Mobility management Function (AMF) (110) of the CN node (100) or a different CN node; and responsive to the selected DNN and the SMF index, sending, to the AMF, a list of SMFs (130) including one or more SMFs corresponding to the SMF index to facilitate establishment by the AMF of a Protocol Data Unit (PDU) session between a wireless terminal (12) and a selected one of the one or more SMFs (130) in the list of SMFs.

45. A Network Repository Function (NRF) (140) of a Core Network (CN) node (100) in a communications network (10), the NRF comprising one or more processing circuits (142) configured to perform any of the steps of claims 42-44.

46. A computer program product for controlling a Network Repository Function (NRF) (140) of a Core Network (CN) node (100) in a communications network (10), the computer program product comprising software instructions which, when run on at least one processing circuit (142) in the NRF (140), causes the NRF to execute the method according to any one of claims 42-44.

47. A computer-readable medium comprising the computer program product of claim 46.

48. The computer-readable medium of claim 47, wherein the computer-readable medium comprises a non-transitory computer-readable medium.

The invention claimed is:

1. A method implemented by a Policy Control Function (PCF) of a Core Network (CN) node in a communications network, the method comprising:

receiving a request message from an Access and Mobility management Function (AMF) of the CN node or a different CN node, the request message comprising a requested Data Network Name (DNN) designated by a wireless terminal in a Protocol Data Unit (PDU) session establishment request to the AMF;

responsive to the request message and to session-specific information, determining a selected DNN and a Session Management Function (SMF) index, the SMF index corresponding to one or more SMFs of the CN node or one or more other CN nodes, each of the one or more SMFs being registered with a Network Repository Function (NRF) of the CN node or the different CN node according to a corresponding SMF profile, and wherein an available pool of SMFs is limited for a particular PDU session based on the session-specific information and the requested DNN; and sending the selected DNN and the SMF index to the AMF to facilitate selection of one of the one or more SMFs via the NRF for establishment of the PDU session between the wireless terminal and the selected SMF.

2. The method of claim 1, wherein the selecting the DNN comprises manipulating the requested DNN to generate the selected DNN or replacing the requested DNN with a selected DNN.

3. The method of claim 1, wherein the session-specific information comprises:

one or more device-specific characteristics of the wireless terminal requesting the PDU session;

one or more subscriber-specific characteristics of a subscriber requesting the PDU session;

one or more capabilities of the one or more SMFs corresponding to the SMF index; and/or one or more heuristic analysis capabilities.

4. The method of claim 3, wherein the one or more device-specific characteristics of the wireless terminal comprises one or more capabilities of the wireless terminal and/or a terminal identifier and/or a location of the wireless terminal in the communications network.

5. The method of claim 3, wherein the one or more subscriber-specific characteristics comprises a subscriber subscription and/or a subscriber identifier.

6. The method of claim 3, wherein the session-specific information is stored in at least the PCF.

7. The method of claim 1, wherein each SMF profile defines one or more supported sets of SMF indexes.

8. The method of claim 7, wherein the one or more supported sets of SMF indexes are configured on a DNN level, and/or on a Single Network Slice Selection Assistance Information (S-NSSAI) level, and/or on an SMF level.

9. A Policy Control Function (PCF) of a Core Network (CN) node in a communications network, the PCF comprising:

processing circuitry;

memory containing instructions executable by the processing circuitry whereby the PCF is operative to:

receive a request message from an Access and Mobility management Function (AMF) of the CN node or a different CN node, the request message comprising a requested Data Network Name (DNN) designated by a wireless terminal in a Protocol Data Unit (PDU) session establishment request to the AMF;

responsive to the request message and to session-specific information, determine a selected DNN and a Session Management Function (SMF) index, the SMF index corresponding to one or more SMFs of the CN node or one or more other CN nodes, each of the one or more SMFs being registered with a Network Repository Function (NRF) of the CN node or the different CN node according to a corresponding SMF profile, and wherein an available pool of SMFs is limited for a particular PDU session based on the session-specific information and the requested DNN; and send the selected DNN and the SMF index to the AMF to facilitate selection of one of the one or more SMFs via the NRF for establishment of the PDU session between the wireless terminal and the selected SMF.

10. A method implemented by an Access and Mobility management Function (AMF) of a Core Network (CN) node in a communications network, the method comprising:

receiving a Protocol Data Unit (PDU) session establishment request from a wireless terminal in the communications network, the PDU session establishment request including a requested Data Network Name (DNN);

sending a request message to a Policy Control Function (PCF) of the CN node or a different CN node, the message comprising the requested DNN;
receiving, in response to the request message, a response message from the PCF, the response message including a selected DNN and a Session Management Function (SMF) index, each selected by the PCF responsive to the requested DNN and session-specific information, the SMF index corresponding to one or more SMFs of the CN node or one or more other CN nodes, each of the one or more SMFs being registered with a Network Repository Function (NRF) of the CN node or the different CN node according to a corresponding SMF profile; and
establishing, responsive to the reception of the response message, a PDU session between the wireless terminal and one of the one or more SMFs associated with the SMF index, wherein an available pool of SMFs is limited for a particular PDU session based on the session-specific information and the requested DNN.

11. The method of claim 10 wherein the establishing the PDU session comprises:
sending the selected DNN and the SMF index from the AMF to the NRF of the CN node or the different CN node;
receiving, from the NRF, a list of SMFs including one or more SMFs corresponding to the SMF index;
selecting one of the one or more SMFs in the list of SMFs for the PDU session; and
establishing the PDU session between the wireless terminal and the selected SMF.

12. The method of claim 10, wherein the session-specific information comprises:
one or more device-specific characteristics of the wireless terminal requesting the PDU session;
one or more subscriber-specific characteristics of a subscriber requesting the PDU session;
one or more capabilities of the one or more SMFs corresponding to the SMF index; and/or
one or more heuristic analysis capabilities.

13. The method of claim 12, wherein the one or more device-specific characteristics of the wireless terminal comprises one or more capabilities of the wireless terminal and/or a terminal identifier and/or a location of the wireless terminal in the communications network.

14. The method of claim 12, wherein the one or more subscriber-specific characteristics comprises a subscriber subscription and/or a subscriber identifier.

15. The method of claim 10, wherein each SMF profile defines one or more supported sets of SMF indexes.

16. The method of claim 15, wherein the one or more supported sets of SMF indexes are configured on a DNN level, and/or on a Single Network Slice Selection Assistance Information (S-NSSAI) level, and/or on an SMF level.

17. An Access and Mobility management Function (AMF) of a Core Network (CN) node in a communications network, the AMF comprising:
processing circuitry;
memory containing instructions executable by the processing circuitry whereby the AMF is operative to:
receive a Protocol Data Unit (PDU) session establishment request from a wireless terminal in the communications network, the PDU session establishment request including a requested Data Network Name (DNN);
send a request message to a Policy Control Function (PCF) of the CN node or a different CN node, the message comprising the requested DNN;
receive, in response to the request message, a response message from the PCF; the response message including a selected DNN and a Session Management Function (SMF) index, each selected by the PCF responsive to the requested DNN and session-specific information, the SMF index corresponding to one or more SMFs of the CN node or one or more other CN nodes, each of the one or more SMFs being registered with a Network Repository Function (NRF) of the CN node or the different CN node according to a corresponding SMF profile, and wherein an available pool of SMFs is limited for a particular PDU session based on the session-specific information and the requested DNN; and
establish, responsive to the reception of the response message, a PDU session between the wireless terminal and one of the one or more SMFs associated with the SMF index.

18. A method implemented by a Core Network (CN) node of a communications network comprising a wireless terminal in communication with the CN node, the method comprising:
receiving a Protocol Data Unit (PDU) session establishment request from the wireless terminal, the PDU session establishment request including a requested Data Network Name (DNN);
responsive to the requested DNN and to session-specific information, determining a selected DNN and a Session Management Function (SMF) index, the SMF index corresponding to one or more SMFs of the CN node or one or more other CN nodes, each of the one or more SMFs being registered with a Network Repository Function (NRF) of the CN node or a different CN node according to a corresponding SMF profile, and wherein an available pool of SMFs is limited for a particular PDU session based on the session-specific information and the requested DNN; and
establishing a PDU session between the wireless terminal and one of the one or more SMFs corresponding to the SMF index and responsive to the selected DNN and the SMF index.

19. A Core Network (CN) node in a communications network, the CN node comprising:
processing circuitry;
memory containing instructions executable by the processing circuitry whereby the CN is operative to:
receive a Protocol Data Unit (PDU) session establishment request from a wireless terminal, the PDU session establishment request including a requested Data Network Name (DNN);
responsive to the requested DNN and to session-specific information, determine a selected DNN and a Session Management Function (SMF) index, the SMF index corresponding to one or more SMFs of the CN node or one or more other CN nodes, each of the one or more SMFs being registered with a Network Repository Function (NRF) of the CN node or a different CN node according to a corresponding SMF profile, and wherein an available pool of SMFs is limited for a particular PDU session based on the session-specific information and the requested DNN; and establish a PDU session between the wireless terminal and one of the one or more SMFs corresponding to the SMF index and responsive to the selected DNN and the SMF index.

* * * * *